United States Patent
Suzuki et al.

[19]

[11] Patent Number: 6,001,264

[45] Date of Patent: Dec. 14, 1999

[54] WATER-TREATING AGENT AND METHOD FOR TREATING WATER

[75] Inventors: Takashi Suzuki; Hideo Morinaga; Katsuhiro Ishikawa; Akihide Hirano, all of Tokyo, Japan

[73] Assignees: Kurita Water Industries Ltd.; Japan Synthetic Rubber Co., Ltd., both of Japan

[21] Appl. No.: 09/015,808

[22] Filed: Jan. 29, 1998

Related U.S. Application Data

[63] Continuation-in-part of application No. 08/699,652, Aug. 19, 1996, Pat. No. 5,716,529.

[30] Foreign Application Priority Data

Aug. 21, 1995 [JP] Japan .................................. 7-234785
Aug. 19, 1996 [JP] Japan .................................. 8-699652

[51] Int. Cl.⁶ .................................................. C02F 5/14
[52] U.S. Cl. ...................... 210/697; 210/699; 210/701; 252/180; 252/181; 422/15; 422/16; 422/17
[58] Field of Search .......................... 210/696–701; 252/180, 181; 422/15–17

[56] References Cited

U.S. PATENT DOCUMENTS

| | | | |
|---|---|---|---|
| 4,115,437 | 9/1978 | Matsuda et al. | 210/698 |
| 5,182,343 | 1/1993 | Ono et al. | 526/240 |
| 5,346,626 | 9/1994 | Momozaki et al. | 210/701 |
| 5,716,529 | 2/1998 | Suzuki et al. | 210/697 |

FOREIGN PATENT DOCUMENTS

| | | |
|---|---|---|
| 0337738 | 10/1989 | European Pat. Off. . |
| 0577016 | 1/1994 | European Pat. Off. . |
| 0428708 | 1/1992 | Japan . |
| 40287089 | 1/1992 | Japan . |

OTHER PUBLICATIONS

Katsumi Ito et al., "Production of Copolymer Containing Sulfonic Acid Group", Patent Abstracts of Japan, vol. 16, No. 194 (C–938), May 11, 1992.

Japan Synthetic Rubber, "Sulpho group–containing copolymers manufactured for treating water . . . " WPI/Derwent, AN 92–085281.

Katsumi Ito et al., "Manufacture of sulfo group–containing copolymers as scale inhibitors and dispersants" Chemical Abstracts, vol. 116, No. 26, Jun. 29, 1992, abst. no. 256737p, pp. 49–50.

*Primary Examiner*—Peter A. Hruskoci
*Attorney, Agent, or Firm*—Morrison Law Firm

[57] ABSTRACT

A water-treating agent comprising a ternary copolymer of conjugated dienesulfonic acid/(meth)acrylic acid/2-hydroxyethyl (meth)acrylate, or a ternary copolymer of conjugated dienesulfonic acid/(meth)acrylic acid/(meth)acrylamido-2-methylalkanesulfonic acid ternary copolymer, is effective against scaling and fouling in water systems and a method for treating water with the water-treating agent. When combined with a corrosion inhibitor, the water-treating agent exhibits an excellent anti corrosion effect.

7 Claims, 1 Drawing Sheet

WATER-TREATING AGENT AND METHOD FOR TREATING WATER

This application is a continuation-in-part of Ser. No. 08/699,652, filed Aug. 19, 1996 now U.S. Pat. No. 5,716,529.

BACKGROUND OF THE INVENTION

The present invention relates to a novel water-treating agent and a method for treating water with the novel water-treating agent. More precisely, the present invention relates to a novel water-treating agent which prevents scale, sludge, and slime deposition.

The novel water-treating agent of the present invention can be used in, for example, heating pipes, heat exchangers, condensers, reaction vessels, chemical reactors, and various pipe runs found in, for example, boilers, cooling water systems, hot water systems, chemical plants, and dust collecting water plants.

The novel water-treating agent of the present invention prevents such problems as heat transfer failure, flow rate reduction, and corrosion that are caused by the adhesion or deposition of scale, sludge, and slime onto heating pipes, heat exchangers, condensers, reactors for polymerization, and various other pipe lines.

The present invention also relates to a method of using the water-treating agent for treating water in, for example, heating pipes, heat exchangers, condensers, reaction vessels, chemical reactors, and various pipe runs found in, for example, boilers, cooling water systems, hot water systems, chemical plants, and dust collecting water plants.

Heretofore, polyphosphates and carboxylic acid polymers have been used as scale inhibiting and fouling prevention agents in boilers, cooling water systems, dust collecting water plants and water supply piping systems to prevent the adhesion of scale onto the surfaces of the metal parts kept in contact with water, to prevent the deposition of sludge onto such metal parts, and to prevent the local corrosion in the area under the fouled parts covered with scale and slime.

However, polyphosphates are inadequate in that they are easily hydrolyzed to give orthophosphates, which in turn precipitate as calcium phosphate in water systems having high pH and high calcium hardness at high temperatures. Hence, polyphosphates too often accelerate scale troubles instead of alleviating them.

In addition, waste waters containing phosphorus are problematic because the phosphorus laden waters cause eutrophication in closed water areas such as lakes, marshes and island seas. Hence, the use of phosphorus containing chemicals must be limited and are often regulated by law.

On the other hand, carboxylic acid polymers have their own problems. They form insoluble salts in water containing high concentrations of polyvalent metal ions, with the result that the polymers are not effective in such water. In particular, where the polymers are applied to water with a high calcium ion concentration, the water becomes cloudy due to the calcium salts forming and precipitating.

In Japanese Laid Open Patent Application No. 2-9496, a phosphorus free water-treating agent for scale inhibition is proposed which comprises a copolymer of a conjugated diene-sulfonic acid and (meth)acrylic acid which is said to be effective, even in systems having high metal ion concentrations, without being precipitated therein.

However, when compared with sodium polyacrylate, which has heretofore been used in conventional water-treating agents, the copolymer of 2-9496 is superior to sodium polyacrylate but is still not completely satisfactory. Therefore, a water-treating agent having much improved effectiveness against scale retarding and fouling is still needed.

OBJECTS AND SUMMARY OF THE INVENTION

It is an object of the present invention to provide a phosphorus-free water-treating agent which does not react with polyvalent ions to form insoluble salts.

It is an object of the present invention to provide a phosphorus-free water-treating agent which provides effective and long lasting inhibition of scale formation and a method for treating water therewith.

In addition, it is an object of the present invention to provide a water-treating agent having excellent metal corrosion prevention properties and a method for treating water therewith.

It is an object of the present invention to provide a phosphorus-free water-treating agent comprising a ternary copolymer comprising conjugated dienesulfonic acid units, (meth)acrylic acid units, and 2-hydroxyethyl (meth)acrylate units or (meth)acrylamido-2-methylalkanesulfonic acid units.

It is an object of the present invention to provide a ternary copolymer which exhibits excellent scaling inhibition and fouling prevention.

It is an object of the present invention to provide a water-treating agent comprising a ternary copolymer which is synthesized from:

A) a conjugated diene-sulfonic acid and/or its salt of the following general formula [1]:

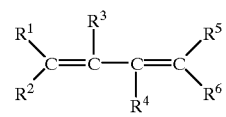

[1]

wherein $R^1$, $R^2$, $R^3$, $R^4$, $R^5$ and $R^6$ each represent a hydrogen atom, a methyl group or $-SO_3X^1$, provided that one or more of $R^1$ to $R^6$ are methyl groups, one or more of the remaining $R^1$ to $R^6$ are groups of $-SO_3X^1$, and wherein $X^1$ represents a hydrogen atom, a monovalent metal, an unsubstituted ammonium group, or an ammonium group mono substituted by an organic group;

B) a (meth)acrylic acid and/or its salts of the following general formula [2]:

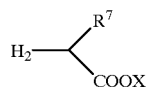

[2]

wherein $R^7$ represents a hydrogen atom or a methyl group; and $X^2$ represents a hydrogen atom, a monovalent metal, an unsubstituted ammonium group, or an ammonium group mono-substituted by an organic group;

and C) a 2-hydroxyethyl (meth)acrylate of the following general formula [3]:

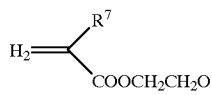

wherein $R^8$ represents either a hydrogen atom or a methyl group, or a (meth)acrylamido-2-methylalkanesulfonic acid and/or its salt of the following general formula [4]:

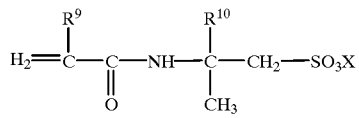

wherein $R^9$ and $R^{10}$ each represent a hydrogen atom or a methyl group; and $X^3$ represents a hydrogen atom, a monovalent metal, an unsubstituted ammonium group, or an ammonium group mono-substituted by an organic group.

It is an object of the present invention to provide a method for treating water, comprising adding to water systems a water-treating agent, in an amount of from 0.1 to 1000 mg/liter, that comprises a ternary copolymer synthesized from:

A) a conjugated diene-sulfonic acid and/or its salt of the following general formula [1]:

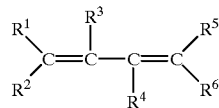

wherein $R^1$, $R^2$, $R^3$, $R^4$, $R^5$ and $R^6$ each represent a hydrogen atom, a methyl group or $-SO_3X^1$, provided that one or more of $R^1$ to $R^6$ are methyl groups, one or more of the remaining $R^1$ to $R^6$ are groups of $-SO_3X^1$, and wherein $X^1$ represents a hydrogen atom, a monovalent metal, an unsubstituted ammonium group, or an ammonium group mono substituted by an organic group;

B) a (meth)acrylic acid and/or its salts of the following general formula [2]:

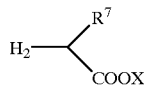

wherein $R^7$ represents a hydrogen atom or a methyl group; and $X^2$ represents a hydrogen atom, a monovalent metal, an unsubstituted ammonium group, or an ammonium group mono substituted by an organic group;

and C) a 2-hydroxyethyl (meth)acrylate of the following general formula [3]:

wherein $R^8$ represents either a hydrogen atom or a methyl group, or a (meth)acrylamido-2-methylalkanesulfonic acid and/or its salt of the following general formula [4]:

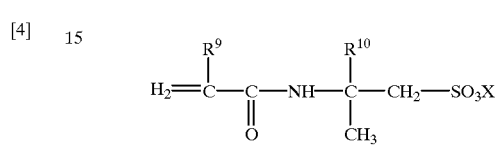

wherein $R^9$ and $R^{10}$ each represent a hydrogen atom or a methyl group; and $X^3$ represents a hydrogen atom, a monovalent metal, an unsubstituted ammonium group, or an ammonium group mono substituted by an organic group.

Briefly stated, a water-treating agent comprising a ternary copolymer of conjugated dienesulfonic acid/(meth)acrylic acid/2-hydroxyethyl (meth)acrylate, or a ternary copolymer of conjugated dienesulfonic acid/(meth)acrylic acid/(meth) acrylamido-2-methylalkanesulfonic acid ternary copolymer, is effective against scaling and fouling in water systems and a method for treating water with the water-treating agent. When combined with a corrosion inhibitor, the water-treating agent exhibits an excellent anti corrosion effect.

According to an embodiment of the present invention, a method to produce a water-treating agent comprises the step of:

polymerizing a combination comprising

A) a first monomer selected from the group consisting of a conjugated dienesulfonic acid and a salt of a conjugated dienesulfonic acid, the conjugated dienesulfonic acid represented by the general formula [1]:

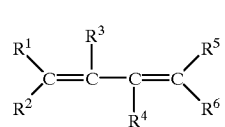

wherein $R^1$, $R^2$, $R^3$, $R^4$, $R^5$ and $R^6$ each represents a member selected from the group consisting of a hydrogen atom, a methyl substituent, and a $-SO_3X^1$ substituent, wherein at least one of $R^1$ to $R^6$ is a methyl substituent, wherein at least one of $R^1$ to $R^6$ is a $-SO_3X^1$ substituent, and wherein $X^1$ represents a member selected from the group consisting of hydrogen atom, a monovalent metal, an ammonium substituent, and an ammonium substituent which is mono substituted by an organic substituent;

B) a second monomer selected from the group consisting of a (meth)acrylic acid and a salt of a (meth)acrylic acid, the (meth)acrylic acid represented by the general formula [2]:

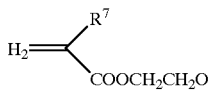

wherein $R^7$ represents a hydrogen atom or a methyl substituent; and $X^2$ represents a member selected from the group consisting of a hydrogen atom, a monovalent metal, an ammonium substituent, and an ammonium substituent which is mono substituted by an organic substituent;

and C) a third monomer selected from the group consisting of a 2-hydroxyethyl (meth)acrylate represented by the general formula [3], a (meth)acrylamido-2-methylalkanesulfonic acid, and a salt of a (meth) acrylamido-2-methylalkanesulfonic acid, the (meth) acrylamido-2-methylalkanesulfonic acid represented by the general formula [4]:

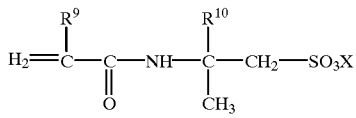

wherein $R^8$ represents a hydrogen atom or a methyl substituent,

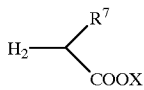

wherein $R^9$ and $R^{10}$ are members selected from the group consisting of a hydrogen atom and a methyl substituent; and $X^3$ represents a member selected from the group consisting of a hydrogen atom, a monovalent metal, an ammonium substituent, and an ammonium substituent which is mono substituted by an organic substituent, to form a ternary copolymer.

According to another embodiment of the present invention, a method to produce a water-treating agent comprises mixing an isoprenesulfonic acid monomer, an acrylic acid monomer, and a 2-hydroxyethyl methacrylate monomer with water to produce an aqueous monomer solution, mixing the aqueous monomer solution with a polymerization initiator while heating and stirring a resultant mixture, maintaining an inert atmosphere over the resultant mixture, continuing heating and stirring until a desired polymerization is attained to produce an attained product, and partially neutralizing the attained product to produce a partially neutralized attained product.

According to an embodiment of the present invention, a method to produce a water-treating agent comprises mixing an isoprenesulfonic acid monomer, an acrylic acid monomer, and an acrylamido-2-methylpropanesulfonic acid monomer with water to produce an aqueous monomer solution, mixing the aqueous monomer solution with a polymerization initiator while heating and stirring a resultant mixture, maintaining an inert atmosphere over the resultant mixture, continuing heating and stirring until a desired polymerization is attained to produce an attained product, and partially neutralizing the attained product to produce a partially neutralized attained product.

According to an embodiment of the present invention, a method for treating water to prevent scale and slime formation and to prevent fouling, comprises the steps of: polymerizing a combination comprising A) a first monomer selected from the group consisting of a conjugated dienesulfonic acid and a salt of a conjugated dienesulfonic acid, the conjugated dienesulfonic acid represented by the general formula [1]:

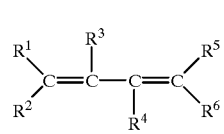

wherein $R^1$, $R^2$, $R^3$, $R^4$, $R^5$ and $R^6$ each represents a member selected from the group consisting of a hydrogen atom, a methyl substituent, and a —$SO_3X^1$ substituent, wherein at least one of $R^1$ to $R^6$ is a methyl substituent, wherein at least one of $R^1$ to $R^6$ is a —$SO_3X^1$ substituent, and wherein $X^1$ represents a member selected from the group consisting of hydrogen atom, a monovalent metal, an ammonium substituent, and an ammonium substituent which is mono substituted by an organic substituent;

B) a second monomer selected from the group consisting of a (meth)acrylic acid and a salt of a (meth)acrylic acid, the (meth)acrylic acid represented by the general formula [2]:

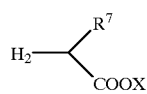

wherein $R^7$ represents a hydrogen atom or a methyl substituent; and $X^2$ represents a member selected from the group consisting of a hydrogen atom, a monovalent metal, an ammonium substituent, and an ammonium substituent which is mono substituted by an organic substituent;

and C) a third monomer selected from the group consisting of a 2-hydroxyethyl (meth)acrylate represented by the general formula [3], a (meth)acrylamido-2-methylalkanesulfonic acid, and a salt of a (meth) acrylamido-2-methylalkanesulfonic acid, the (meth) acrylamido-2-methylalkanesulfonic acid represented by the general formula [4]:

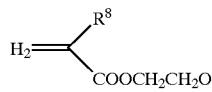

wherein $R^8$ represents a hydrogen atom or a methyl substituent,

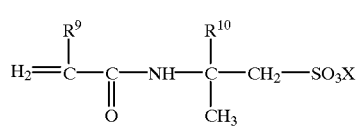

wherein $R^9$ and $R^{10}$ are members selected from the group consisting of a hydrogen atom and a methyl substituent; and $X^3$ represents a member selected from the group consisting of a hydrogen atom, a monovalent metal, an ammonium substituent, and an ammonium substituent which is mono substituted by an organic substituent, to form a ternary copolymer, and adding the ternary copolymer to a water system in an amount of from about 0.1 to about 1000 mg/liter.

According to another embodiment of the present invention, a water-treating agent for treating water to prevent scale and slime formation and to prevent fouling, comprises the product formed by polymerizing a combination comprising A) a first monomer selected from the group consisting of a conjugated dienesulfonic acid and a salt of a conjugated dienesulfonic acid, the conjugated dienesulfonic acid represented by the general formula [1]:

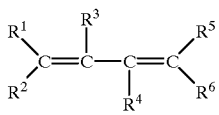

[1]

wherein $R^1$, $R^2$, $R^3$, $R^4$, $R^5$ and $R^6$ each represents a member selected from the group consisting of a hydrogen atom, a methyl substituent, and a —$SO_3X^1$ substituent, wherein at least one of $R^1$ to $R^6$ is a methyl substituent, wherein at least one of $R^1$ to $R^6$ is a —$SO_3X^1$ substituent, and wherein $X^1$ represents a member selected from the group consisting of hydrogen atom, a monovalent metal, an ammonium substituent, and an ammonium substituent which is mono substituted by an organic substituent;

B) a second monomer selected from the group consisting of a (meth)acrylic acid and a salt of a (meth)acrylic acid, the (meth)acrylic acid represented by the general formula [2]:

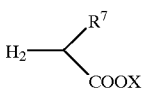

[2]

wherein $R^7$ represents a hydrogen atom or a methyl substituent; and $X^2$ represents a member selected from the group consisting of a hydrogen atom, a monovalent metal, an ammonium substituent, and an ammonium substituent which is mono substituted by an organic substituent;

and C) a third monomer selected from the group consisting of a 2-hydroxyethyl (meth)acrylate represented by the general formula [3], a (meth)acrylamido-2-methylalkanesulfonic acid, and a salt of a (meth)acrylamido-2-methylalkanesulfonic acid, the (meth)acrylamido-2-methylalkanesulfonic acid represented by the general formula [4]:

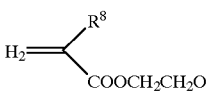

[3]

wherein $R^8$ represents a hydrogen atom or a methyl substituent, wherein $R^9$ and $R^{10}$ are members selected from the group consisting of a hydrogen atom and a methyl substituent; and $X^3$ represents a member selected from the group consisting of a hydrogen atom, a monovalent metal, an ammonium substituent, and an ammonium substituent which is mono substituted by an organic substituent, to form a ternary copolymer.

According to another embodiment of the present invention, the ternary copolymer used as a water-treating agent comprises from about 5 to about 50 mol % of the unit derived from the conjugated dienesulfonic acid and/or its salt, from about 40 to about 90 mol % of the unit derived from the (meth)acrylic acid and/or its salt, and from about 1 to about 20 mol % of the unit derived from the (meth)acrylamido-2-methylalkanesulfonic acid and/or its salt.

According to still another embodiment of the present invention, the ternary copolymer used as a water-treating agent has a weight average molecular weight of from about 500 to about 300,000.

According to another embodiment of the present invention, the water-treating agent further includes a corrosion inhibitor and a ternary copolymer.

According to another embodiment of the present invention, the water-treating agent further includes a metal corrosion inhibitor and a ternary copolymer.

According to an embodiment of the present invention, the corrosion inhibitor to be optionally in the water-treating agent comprises at least one member selected from the group consisting of polyvalent metal salts, polyvalent metal phosphonates, polyvalent metal azoles, polyvalent metal phosphates, polyvalent metal phosphocarboxylates, polyvalent metal amines and polyvalent metal phosphoric esters.

According to an embodiment of the present invention, a method for treating water comprises adding to water systems a water-treating agent which comprises the ternary copolymer that includes from about 5 to about 50 mol % of the unit derived from the conjugated dienesulfonic acid and/or its salt, from about 40 to about 90 mol % of the unit derived from the (meth)acrylic acid and/or its salt, and from about 1 to about 20 mol % of the unit derived from the 2-hydroxyethyl (meth)acrylate.

According to another embodiment of the present invention, a method for treating water comprises adding to water systems a water-treating agent which comprises from about 5 to about 50 mol % of the unit derived from the conjugated dienesulfonic acid and/or its salt, from about 40 to about 90 mol % of the unit derived from the (meth)acrylic acid and/or its salt, and from about 1 to about 20 mol % of the unit derived from the (meth)acrylamido-2-methylalkanesulfonic acid and/or its salt.

According to still another embodiment of the present invention, a method for treating water comprises adding to water systems a water-treating agent which comprises the ternary copolymer having a weight-average molecular weight of from about 500 to about 300,000.

According to still another embodiment of the present invention, a method for treating water comprises adding to water systems a water-treating agent comprising a corrosion inhibitor in addition to a ternary copolymer.

According to still another embodiment of the present invention, a method for treating water comprises adding to water systems a water-treating agent comprising, in addition to a ternary copolymer, a corrosion inhibitor which includes at least one member selected from the group consisting of polyvalent metal salts, polyvalent metal phosphonates, polyvalent metal azoles, polyvalent metal phosphates, polyvalent metal phosphocarboxylates, polyvalent metal amines and polyvalent metal phosphoric esters.

DETAILED DESCRIPTION OF THE PREFERRED EMBODIMENT

Figure 1:
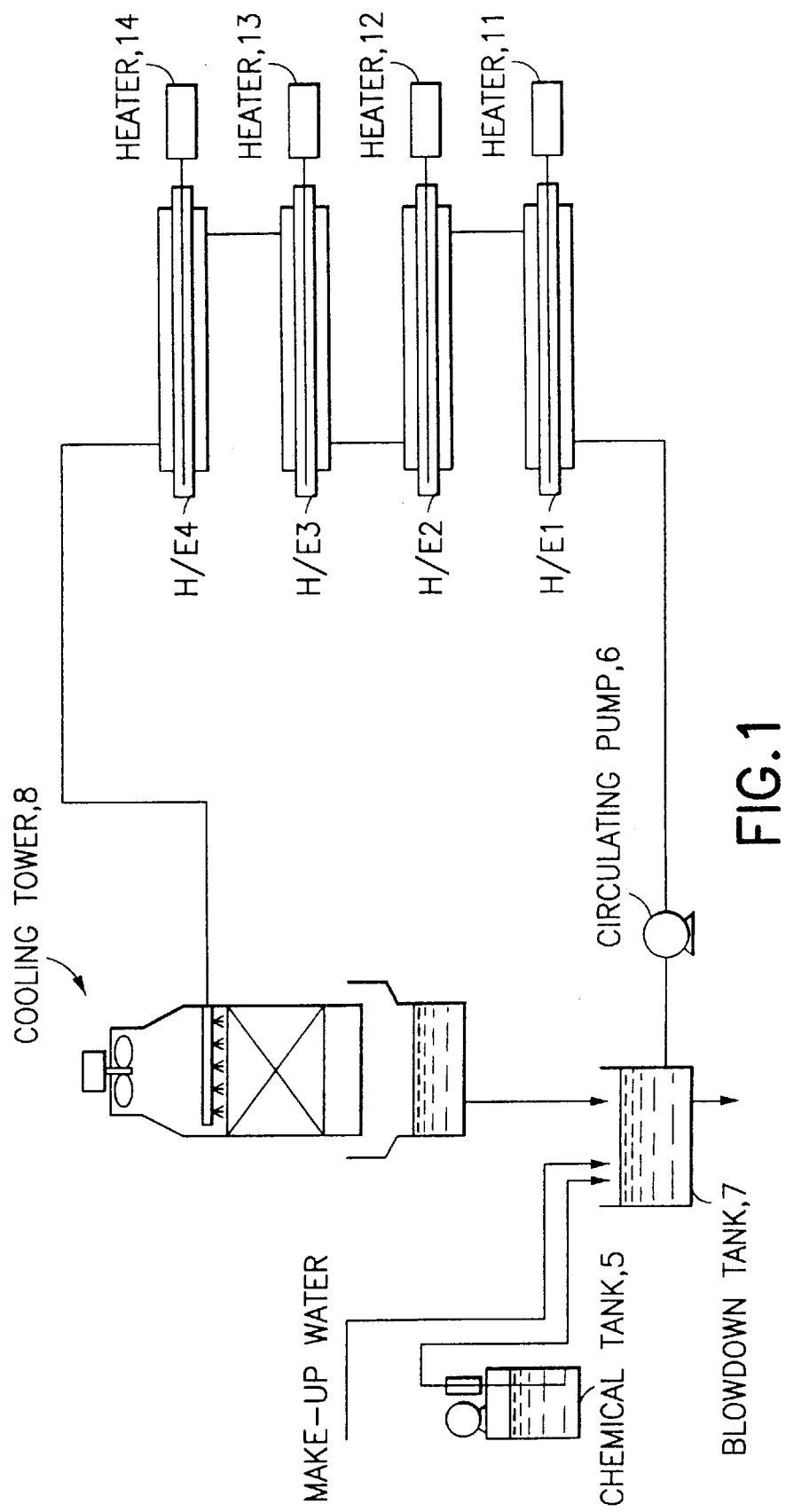
FIG. 1 is a flow diagram of the pilot plant of a water-cooling system as used here in Examples 27 to 29 and Comparative Examples 51 to 52.

The water-treating agent of the present invention comprises a copolymer which is synthesized from the following three parts:

(A) a conjugated dienesulfonic acid and/or its salts of the following general formula [1];
(B) a (meth)acrylic acid and/or its salts of the following general formula [2]; and
(C) a 2-hydroxyethyl (meth)acrylate of the following general formula [3] or a (meth)acrylamido-2-methylalkanesulfonic acid and/or its salt of the following general formula [4]:

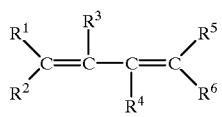

[1]

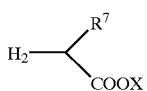

[2]

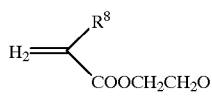

[3]

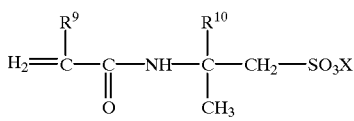

[4]

In formula [1], $R^1$, $R^2$, $R^3$, $R^4$, $R^5$ and $R^6$ each represents a hydrogen atom, a methyl group or the $-SO_3X^1$ group, provided that one or more of $R^1$ to $R^6$ are methyl groups, one or more of the remaining $R^1$ to $R^6$ are $-SO_3X^1$ groups, and in which $X^1$ represents a hydrogen atom, a monovalent metal, or an ammonium group. The ammonium group is either unsubstituted or mono substituted by an organic group.

In formula [2], $R^7$ represents a hydrogen atom or a methyl group; and $X^2$ represents a hydrogen atom, a monovalent metal, an unsubstituted ammonium group or an ammonium group mono substituted by an organic group.

In formula [3], $R^8$ represents a hydrogen atom or a methyl group.

In formula [4], $R^9$ and $R^{10}$ each represent a hydrogen atom or a methyl group; and $X^3$ represents a hydrogen atom, a monovalent metal, or an unsubstituted ammonium group or an ammonium group mono-substituted by an organic group.

In the above formulas, the ammonium group mono substituted by an organic group is, for example, an ammonium group formed through the reaction of $-SO_3H$ or $-COOH$ with a primary amine. The primary amine includes, for example, methylamine, ethylamine, propylamine, isopropylamine, butylamine, isobutylamine, sec-butylamine, tert-butylamine, pentylamine, hexylamine, cyclohexylamine, benzylamine, and monoethanolamine.

In the water-treating agent of the present invention which has the ability to inhibit scaling and to prevent fouling in water plants, $X^1$ and $X^2$ each are preferably an alkali metal, more preferably sodium.

The conjugated dienesulfonic acid of formula [1] includes, for example, 2-methyl-1,3-butadiene-1-sulfonic acid, 2-methyl-1,3-butadiene-3-sulfonic acid, 2-methyl-1,3-butadiene-4-sulfonic acid, 1,3-pentadiene-1-sulfonic acid, 1,3-pentadiene-2-sulfonic acid, 1,3-pentadiene-3-sulfonic acid, 1,3-pentadiene-4-sulfonic acid, 2,3-dimethylbutadiene-1-sulfonic acid, 2-methyl-1,3-pentadiene-4-sulfonic acid, 3-methyl-1,3-pentadiene-1-sulfonic acid, 2-methyl-1,3-butadiene-1,3-disulfonic acid, and 2-methyl-1,3-butadiene-1,4-disulfonic acid.

The (meth)acrylic acid of formula [2] includes acrylic acid and methacrylic acid. Acrylic acid is preferably used in the water-treating agent of the present invention.

The 2-hydroxyethyl (meth)acrylate of formula [3] includes 2-hydroxyethyl acrylate and 2-hydroxyethyl methacrylate. 2-Hydroxyethyl methacrylate is preferably used in the water-treating agent of the present invention.

The method of producing the terpolymer of the present invention may be by any convenient conventional method. Copolymerizing the constituents including the conjugated dienesulfonic acid and/or its salt of formula [1], the (meth)acrylic acid and/or its salt of formula [2], and the 2-hydroxymethyl (meth)acrylate of formula [3] or the (meth)acrylamido-2-methylalkanesulfonic acid and/or its salt of formula [4] to obtain the ternary copolymer for use in the present invention is not specifically defined but may be by any convenient conventional method.

The monomer of formula [1], the monomer of formula [2] and the monomer of formula [3] or [4] are all generally substantially soluble in water, and the ternary copolymer to be obtained through copolymerization of such monomers is also substantially soluble in water. Accordingly, a solution polymerization method using water as the medium is preferably employed to copolymerize the starting monomers for the present invention.

One example of solution polymerization using water as the medium, which is employable in the present invention, includes the steps of dissolving the pre-determined monomers in water, substituting the atmosphere around the resulting system with nitrogen, adding a water soluble radical polymerization initiator thereto, and heating the system.

The radical polymerization initiator includes, for example, hydrogen peroxide, sodium persulfate, potassium persulfate, ammonium persulfate, 2,2'-azobis(2-amidinopropane) dihydrochloride, and t-butyl hydroperoxide. The polymerization initiator can be added in successive increments or all at one time.

The amount of the polymerization initiator to be added may be generally from 0.01 to 5 parts by weight, preferably from 0.1 to 3 parts by weight, relative to 100 parts by weight of the monomers in total. If the amount of the polymerization initiator is less than 0.01 parts by weight, the polymerization of the monomers could not be conducted efficiently, but if the amount of the polymerization initiator is more than 5 parts by weight, the cost of the catalyst increases to become uneconomical.

To promote the radical polymerization, a reducing agent, such as sodium pyrobisulfite, ferrous sulfate, copper sulfate, triethanolamine, glucose, formaldehyde sodium sulfoxylate, L-ascorbic acid or its salt, or sodium hydrogen sulfite, may be added to the polymerization system. Additionally, a chelating agent such as glycine, alanine, or sodium ethylenediamine tetraacetate may be added.

A chain transfer agent can be used to control the molecular weight of the copolymer produced. The chain transfer agent includes, for example, mercaptans such as t-dodecylmercaptan, n-tetradecylmercaptan, octylmercaptan, t-hexylmercaptan, and n-hexylmercaptan; halides such as ethylene bromide; hydrocarbons such as 9,10-dihydroanthracene, 1,4-cyclohexadiene and 1,4-dihydroanthracene; and heterocyclic compounds such as 2,5-dihydrofuran; as well as α-methylstyrene dimers, and xanthogen disulfides. In general, the chain transfer agent can be added in an amount of less than 10 parts by weight relative to 100 parts by weight of the monomers in total.

The polymerization temperature may be from about −50 to about +200° C., preferably from +50 to +150° C. The polymerization time may be from about 0.1 to about 30 hours, within which the radical polymerization shall be conducted.

It is desirable to successively add the monomers to the polymerization reactor. In order to produce a uniform composition of the monomers added and to remove the polymerization heat from the reactor, the time for the addition of the monomers should be from 0.5 to 5 hours, preferably from 1 to 3 hours.

It is desirable that the copolymer in the water-treating agent of the present invention, having the ability to inhibit scaling and to prevent fouling in water plants, comprises from about 5 to about 50 mol % of the unit derived from the conjugated dienesulfonic acid and/or its salt, from about 40 to about 90 mol % of the unit derived from the (meth)acrylic acid and/or its salt, and from about 1 to about 20 mol % of the unit derived from the 2-hydroxyethyl (meth)acrylate or the unit derived from the (meth)acrylamido-2-methylalkanesulfonic acid and/or its salt.

More preferably, the copolymer comprises from 10 to 30 mol % of the unit derived from the conjugated dienesulfonic acid and/or its salt, from 60 to 90 mol % of the unit derived from the (meth)acrylic acid and/or its salt, and from 2 to 15 mol % of the unit derived from the 2-hydroxyethyl (meth) acrylate or the unit derived from the (meth)acrylamido-2-methylalkanesulfonic acid and/or its salt.

In the resultant copolymer which is in the water-treating agent of the present invention having the ability to inhibit scaling and to prevent fouling in water systems, if the content of the unit derived from the conjugated dienesulfonic acid and/or its salt is less than about 5 mol % or more than about 50 mol %, the scaling-inhibition and fouling-prevention properties of the water-treating agent will be less effective. If the content of the unit derived from the (meth)acrylic acid and/or its salt in the resultant copolymer is less than about 40 mol % or more than about 90 mol %, the scaling-inhibition and fouling-prevention properties of the water-treating agent will be also less effective. If the content of the unit derived from the 2-hydroxyethyl (meth) acrylate or that of the unit derived from the (meth) acrylamido-2-methylalkanesulfonic acid and/or its salt is less than about 1 mol % or more than about 20 mol %, the scaling-inhibition and fouling-prevention properties of the water-treating agent will be also less effective.

The copolymer used in the water-treating agent of the present invention which has the ability to inhibit scaling and to prevent fouling in water system may comprise other monomer units, in addition to the units comprising the unit derived from the conjugated dienesulfonic acid and/or its salt of formula [1], the unit derived from the (meth)acrylic acid and/or its salt of formula [2], and the unit derived from the 2-hydroxymethyl (meth)acrylate of formula [3] or the unit derived from the (meth)acrylamido-2-methylalkanesulfonic acid and/or its salt of formula [4].

The copolymers comprising additional monomer units to the above monomers [1], [2], [3], and [4], can be obtained by copolymerizing the monomer of formula [1], the monomer of formula [2], the monomer of formula [3] or [4], and a monomer copolymerizable with these monomers, according to any convenient method such as aqueous solution polymerization.

Such monomers copolymerizable with the monomer of formula [1], the monomer of formula [2] and the monomer of formula [3] or [4] include, for example, 3-allyloxy-2-hydroxypropanesulfonic acid, vinylsulfonic acid, acid phosphoxyethyl methacrylate, acid phosphoxyethyl acrylate, acid phosphoxy polyoxyethylene glycol monomethacrylate, (meth)acrylamide, (meth)acrylonitrile, methyl (meth) acrylate, glycidyl (meth)acrylate, N-methylol(meth) acrylamide, maleic acid, maleic anhydride, styrene, α-methylstyrene, vinyltoluene, p-methylstyrene, and vinyl acetate.

It is desirable that the ternary copolymer in the water-treating agent of the present invention, having the ability to inhibit scaling and to prevent fouling in water systems, has a weight average molecular weight of from about 500 to about 300,000, more preferably from about 5,000 to about 50,000.

If the copolymer in the water-treating agent has a weight average molecular weight of less than about 500, the scaling-inhibition and fouling-prevention effect of the agent will be lowered. If the copolymer has a weight average molecular weight of more than about 300,000, poor handling characteristics will result because the viscosity of the water-treating agent will be too high.

To use the water-treating agent of the present invention, the amount to be added to the water system is suitably selected. The amount depends on the quality of water to be treated therewith, which includes consideration of the parameters of the water's pH, hardness, alkalinity, and temperature. Additionally, the heat-transferring conditions in the system should be considered.

In general, the amount of the water-treating agent to be added should be from about 0.1 to about 1,000 mg/liter, in terms of the solid content of the copolymer in the water-treating agent. In most cases, the amount may be from about 1 to about 100 mg/liter, in terms of the solid content of the copolymer in the water-treating agent, in order for the water-treating agent to exhibit satisfactory scale inhibition and fouling-prevention.

The water-treating agent of the present invention can be used in, for example, boiler systems, cooling water systems, industrial water supply plants, dust collecting water plants, drainage systems and slug cooling systems in the iron industry, and ash cooling systems in garbage incinerators. The present invention can be used to prevent the systems from malfunctions caused by the adhesion or deposition of scale, sludge, or slime onto the surfaces of metal parts in the systems and malfunctions caused by the local corrosion that occurs in the areas under the adhered or deposited layers. Such malfunctions can be a result of the heat transfer failure and flow rate reduction caused by the adhered or deposited scale, sludge, or slime. The process of adding to such water systems the water-treating agent of the present invention having the ability to inhibit scaling and to prevent fouling is not specifically defined but is by any convenient means for users of such water systems.

For example, referring to FIG. 1, the water-treating agent of the present invention can be added to the blowdown tank 7 before the circulating pump 6 circulates water to heat exchangers 1–4. The water-treating agent of the present invention can be added thereto in one dose, in intermittent doses, or continuously.

The water-treating agent can be used alone. However, it is preferably used with a corrosion inhibitor to synergistically increase the corrosion inhibiting effect.

The corrosion inhibitor includes polyvalent metal salts such as zinc salts, nickel salts, molybdates and tungstates; phosphonates; azoles such as triazoles; phosphates such as orthophosphates and polyphosphates; phosphonocarboxylates; amines and phosphoric esters.

The corrosion inhibitor, if used, can be added to the copolymer of the present invention, in an amount of from about 0.1 to about 10 parts by weight relative to one part of the copolymer. To combine the inhibitor and the copolymer, predetermined amounts of each can be previously mixed to give one formulation which is added to the water systems, or alternatively, the inhibitor and the copolymer can be separately added to the water systems in such a manner that leads to predetermined amounts or concentrations of the two ingredients existing therein.

The water-treating agent of the present invention may further contain other water-treating agents. Such water-treating agents include other scaling-inhibition and fouling-prevention chemicals, microbicides (slime controlling agents), acids, and alkalis. The scaling-inhibition chemicals include, for example, polyacrylates, polyacrylamides and their partial hydrolysis products, maleic acid polymers, itaconic acid polymers, and binary acrylic copolymers comprising 2-hydroxyethyl methacrylate and hydroxyallyloxypropanesulfonic acid.

The microbicides (slime controlling agents) include, for example, chlorine compounds such as chlorine gas, sodium and potassium hypochlorite, and sodium chloroisocyanurate; inorganic and organic, bromine containing agents; organic nitrogen sulfur compounds; and quaternary ammonium salts.

The present invention is described in more detail below with reference to the following production examples and examples which, however, are not intended to restrict the scope of the present invention.

EXAMPLES

Production Example 1

The three monomers of 189.1 g of isoprenesulfonic acid (commercially-available product with an acid content of 40% by weight), 200.3 g of acrylic acid (commercially available product with an acid content of 80% by weight), and 40.6 g of 2-hydroxyethyl methacrylate (commercially available product with an ester content of 95% by weight) were mixed to prepare an aqueous monomer solution comprising the monomers. The molar percent ratio of isoprenesulfonic acid/acrylic acid/2-hydroxyethyl methacrylate in the aqueous solution was 15/75/10.

228.7 g of water and 13.7 g of 30 wt. %-hydrogen peroxide aqueous solution were put into a one liter, four neck separable flask. The flask was equipped with a stirrer, a reflux condenser, a dropping funnel and a nitrogen gas introducing tube. The aqueous monomer solution previously prepared above was dropwise added into the flask over a period of 2 hours, under inert atmosphere, while maintaining the inner temperature of the flask at 100° C., to cause polymerization.

After the addition of the monomer solution, the polymerization was conducted further for one hour, and then 40.8 g of a 48 wt. %-sodium hydroxide aqueous solution was added to the reaction mixture to partially neutralize it. This process yielded a ternary polymer having a number average molecular weight of 14,000. The resulting copolymer was used in Example 2.

Using the same procedure as above but varying the compositional ratio of the initial monomers to be reacted, various copolymers having different monomer compositions were obtained as shown in Tables 1 to 4.

IA) Test for Gelling of Scaling-inhibition and fouling-prevention Agent with Calcium Ion Example 1

The ingredients of 1) demineralized water, 2) a pH buffering solution comprising boric acid and sodium borate, 3) a solution of the scaling-inhibition and fouling-prevention agent comprising the sodium salt of the isoprenesulfonic acid/acrylic acid/2-hydroxyethyl methacrylate (20/75/5, by mol %) ternary copolymer having a weight average molecular weight of 14,000, and 4) a solution of calcium chloride were put into a 500 ml conical beaker in that order, to prepare 500 ml of a test liquid having a pH of 8.5, a solid content of the scaling-inhibition and fouling-prevention agent of 100 mg/liter, and a calcium hardness, in terms of $CaCO_3$ content, of 50 mg/liter.

By varying the amount of the calcium chloride solution added, the same process as above was repeated to prepare various test liquids of 500 ml each, having the calcium hardness values, in terms of $CaCO_3$ content, of 100, 200, 300, 400, 500, 600, 700, 800, 900, 1000, 1100, or 1200 mg/liter.

The conical beakers were each sealed with a polyethylene film, and left in a water bath filled with water having a controlled temperature of 90° C., for 1 hour. After this treatment, the degree of turbidity of each test liquid was measured. The turbidity results from any gel formed in each test liquid through the bonding of calcium ions to the copolymer of the scaling-inhibition and fouling-prevention agent.

The test liquids having a calcium concentration, the calcium hardness values in terms of $CaCO_3$, of 900 mg/liter or less did not become turbid, while those having a calcium concentration of 1000 mg/liter or more became turbid.

The minimum calcium hardness (calcium concentration) that would make the test liquid cloudy (turbid) was defined to be the anti-gelling concentration for the copolymer tested. According to this definition, the anti-gelling concentration for the copolymer of the scale inhibiting and fouling-prevention agent tested in this example was 1000 mg of $CaCO_3$/liter.

Example 2

The same experiment as in Example 1 was repeated, except that a solution of the sodium salt of the isoprenesulfonic acid/acrylic acid/2-hydroxyethyl methacrylate (15/75/10, by mol %) ternary copolymer having a weight average molecular weight of 14,000 was used as the scaling-inhibition and fouling-prevention agent. The anti-gelling concentration for the inhibiting retarding and fouling-prevention agent tested in this example was 500 mg of $CaCO_3$/liter.

Example 3

The same experiment as in Example 1 was repeated, except that a solution of the sodium salt of the isoprenesulfonic acid/acrylic acid/2-hydroxyethylmethacrylate (20/70/10, by mol %) ternary copolymer having a weight average molecular weight of 13,000 was used as the scaling-inhibition and fouling-prevention agent. The anti-gelling concentration for the inhibiting retarding and fouling-prevention agent tested in this example was 1,000 mg of $CaCo_3$/liter.

Example 4

The same experiment as in Example 1 was repeated, except that a solution of the sodium salt of the isoprenesulfonic acid/acrylic acid/2-hydroxyethylmethacrylate (20/70/10, by mol %) ternary copolymer having a weight average molecular weight of 9,000 was used as the scaling-inhibition and fouling-prevention agent. The amount of 30 wt %-hydrogen peroxide aqueous solution added in Production Example 1 was 21.3 g, to produce a polymer of MW 9,000. The anti-gelling concentration for the inhibiting retarding and fouling-prevention agent tested in this example was 1,000 mg of $CaCo_3$/liter.

Comparative Example 1

The same experiment as in Example 1 was repeated, except that a solution of the sodium salt of the isoprenesulfonic acid/acrylic acid (25/75, by mol %) binary copolymer having a weight average molecular weight of 10,000 was used as the scale retarding and soil preventing agent. The anti-gelling concentration for the scaling-inhibition and fouling-prevention agent tested in this comparative example was 400 mg of $CaCO_3$/liter.

Comparative Example 2

The same experiment as in Example 1 was repeated, except that a solution of the sodium salt of the isoprenesulfonic acid/acrylic acid (25/75, by mol %) binary copolymer having a weight average molecular weight of 15,000 was used as the scaling-inhibition and fouling-prevention agent. The anti-gelling concentration for the scaling-inhibition and fouling-prevention agent tested in this comparative example was 400 mg of $CaCO_3$/liter.

Comparative Example 3

The same experiment as in Example 1 was repeated, except that a solution of the sodium salt of the isoprenesulfonic acid/acrylic acid/2-hydroxyethylmethacrylate (18/72/10, by mol %) ternary copolymer having a weight average molecular weight of 16,000 was used as the scaling-inhibition and fouling-prevention agent. The anti-gelling concentration for the inhibiting retarding and fouling-prevention agent tested in this example was 800 mg of $CaCo_3$/liter.

Comparative Example 4

The same experiment as in Example 1 was repeated, except that a solution of the sodium salt of the isoprenesulfonic acid/acrylic acid/2-hydroxyethylmethacrylate (20/75/5, by mol %) ternary copolymer having a weight average molecular weight of 14,000 was used as the scaling-inhibition and fouling-prevention agent. The anti-gelling concentration for the inhibiting retarding and fouling-prevention agent tested in this example was 1,000 mg of $CaCo_3$/liter.

Comparative Example 5

The same experiment as in Example 1 was repeated, except that a solution of the sodium salt of the isoprenesulfonic acid/acrylic acid/2-hydroxyethylmethacrylate (15/75/10, by mol %) ternary copolymer having a weight average molecular weight of 14,000 was used as the scaling-inhibition and fouling-prevention agent. The anti-gelling concentration for the inhibiting retarding and fouling-prevention agent tested in this example was 500 mg of $CaCo_3$/liter.

Comparative Example 6

The same experiment as in Example 1 was repeated, except that a solution of a sodium polyacrylate having a weight average molecular weight of 5,000 was used as the scale retarding and soil preventing agent. The anti-gelling concentration for the scale inhibiting and fouling-prevention agent tested in this comparative example was 100 mg of $CaCO_3$/liter.

The results of Examples 1 to 4, and Comparative Examples 1 to 6 are shown in Table 1.

TABLE 1

| Sample | Scaling-inhibition and fouling-prevention agent | IPS/AA/HEMA (mol %) | Molecular Weight | Amount Added (mg solid content/l) | Anti-gelling Concentration (mg $CaCO_3$/l) |
|---|---|---|---|---|---|
| Example 1 | IPS/AA/HEMA copolymer[1] | 20/75/5 | 14,000 | 100 | 1,000 |
| Example 2 | IPS/AA/HEMA copolymer[1] | 15/75/10 | 14,000 | 100 | 500 |
| Example 3 | IPS/AA/HEMA copolymer[1] | 20/70/10 | 13,000 | 100 | 1,000 |
| Example 4 | IPS/AA/HEMA copolymer[1] | 20/70/10 | 9,000 | 100 | 1,000 |
| Comparative Ex. 1 | IPS/AA copolymer[1] | 25/75/0 | 10,000 | 100 | 400 |
| Comparative Ex. 2 | IPS/AA copolymer[1] | 25/75/0 | 15,000 | 100 | 400 |
| Comparative Ex. 3 | IPS/AA/HEMA copolymer[1] | 18/72/10 | 16,000 | 100 | 800 |
| Comparative Ex. 4 | IPS/AA/HEMA copolymer[1] | 20/75/5 | 14,000 | 100 | 1,000 |
| Comparative Ex. 5 | IPS/AA/HEMA copolymer[1] | 15/75/10 | 14,000 | 100 | 500 |
| Comparative Ex. 6 | Sodium polyacrylate | 0/100/0 | 5,000 | 100 | 100 |

[1]Sodium Salt
IPS: Isoprenesulfonic acid
AA: Acrylic acid
HEMA: 2-hydroxyethylmethacrylate A higher anti-gelling concentration value is desirable because more scaling-inhibition and fouling-prevention agent can be used for a given water hardness. Further, the scaling-inhibition and fouling-prevention agent with the higher anti-gelling value can be used over a wider range of water hardnesses.

The scaling-inhibition and fouling-prevention agent, for which the anti-gelling concentration is higher, can be more stably dissolved in water having a high calcium hardness while still exhibiting a greater effectiveness for scaling-inhibition and fouling-prevention.

It is apparent from the results of the above examples and comparative examples that the scaling-inhibition and fouling-prevention agents of the present invention, comprising in the examples of an isoprenesulfonic acid/acrylic acid/2-hydroxyethyl methacrylate ternary copolymer are superior to the prior art. The present invention examples exhibit higher anti-gelling ability than the comparative examples of the prior art.

Therefore, the scaling-inhibition and fouling-prevention agents of the present invention can be dissolved more stably in water having a higher calcium hardness than the prior art agents such as sodium polyacrylate or the isoprenesulfonic acid/acrylic acid copolymer.

IB) Test for Preventing Precipitation of Calcium Phosphate

Example 5

The ingredients of 1) demineralized water, 2) a pH buffering solution comprising boric acid and sodium borate, 3) a solution of calcium chloride, 4) a solution of a scaling-inhibition and fouling-prevention agent comprising the sodium salt of an isoprenesulfonic acid/acrylic acid/2-hydroxyethyl methacrylate (20/75/5, by mol %) ternary copolymer having a weight-average molecular weight of 14,000, and 5) a solution of sodium phosphate were put into a 500-ml conical beaker in that order, to prepare 500 ml of a test liquid having a pH of 8.6, a solid content of the scaling-inhibition and fouling-preventing agent of 8 mg/liter, a calcium hardness, in terms of $CaCO_3$ content, of 100 mg/liter, and a phosphate ion concentration, in terms of $PO_4^{3-}$, of 10 mg/liter.

The conical beaker was sealed with a polyethylene film, and left in a water bath filled with water having a controlled temperature of 60° C. After 40 hours, the test liquid was taken out and filtered through a filer paper having a pore diameter of 0.1 µm, and the phosphate ion concentration which remained in the resulting filtrate was measured to be 9.5 mg $PO_4^{3-}$/liter.

Example 6

The same experiment as in Example 5 was repeated, using the same scaling-inhibition and fouling-prevention agent as that used in Example 5, except that the concentration of the agent was, in terms of the solid content, 6 mg/liter. The phosphate ion concentration which remained in the filtrate was 4.2 mg $PO_4^{3-}$/liter.

Example 7

The same experiment as in Example 5 was repeated, except that a solution of the sodium salt of an isoprene-sulfonic acid/acrylic acid/2-hydroxyethyl methacrylate (15/75/10, by mol %) ternary copolymer having a weight average molecular weight of 14,000 was used as the scaling-inhibition and fouling-prevention agent with the concentration, in terms of the solid content, of the agent being 8 mg/liter. The phosphate ion concentration which remained in the filtrate was 9.1 mg $PO_4^{3-}$/liter.

Example 8

The same experiment as in Example 5 was repeated, using the same scaling-inhibition and fouling-prevention agent as that used in Example 7 except that the concentration, in terms of the solid content, of the agent was changed to 6 mg/liter. The phosphate ion concentration which remained in the filtrate was 2.8 mg $PO_4^{3-}$/liter.

Example 9

The same experiment as in Example 5 was repeated, except that a solution of the sodium salt of the isoprene-sulfonic acid/acrylic acid/2-hydroxyethylmethacrylate (20/70/10, by mol %) ternary copolymer having a weight average molecular weight of 13,000 was used as the scaling-inhibition and fouling-prevention agent with the concentration, in terms of the solid content, of the agent being 8 mg/liter. The phosphate ion concentration which remained in the filtrate was 9.7 mg $PO_4^{3-}$/liter.

Example 10

The same experiment as in Example 5 was repeated, except that a solution of the sodium salt of the isoprene-sulfonic acid/acrylic acid/2-hydroxyethylmethacrylate (20/70/10, by mol %) ternary copolymer having a weight average molecular weight of 9,000 was used as the scaling-inhibition and fouling-prevention agent with the concentration, in terms of the solid content, of the agent being 8 mg/liter. The amount of 30 wt %-hydrogen peroxide aqueous solution added in Production Example 1 was 21.3 g, to produce a polymer of MW 9,000. The phosphate ion concentration which remained in the filtrate was 9.4 mg $PO_4^{3-}$/liter.

Comparative Example 7

The same experiment as in Example 5 was repeated, except that a solution of the sodium salt of an isoprene-sulfonic acid/acrylic acid (25/75, by mol %) binary copolymer having a weight average molecular weight of 15,000 was used as the scaling-inhibition and the fouling-prevention agent and that the concentration, in terms of the solid content, of the agent was 12 mg/liter. The phosphate ion concentration which remained in the filtrate was 9.2 mg $PO_4^{3-}$/liter.

Comparative Example 8

The same experiment as in Example 5 was repeated, except that the same scaling-inhibition and fouling-prevention agent as that used in Comparative Example 7 was used and that the concentration of the agent was varied to 10 mg, in terms of the solid content, per liter. The phosphate ion concentration which remained in the filtrate was 6.3 mg $PO_4^{3-}$/liter.

Comparative Example 9

The same experiment as in Example 5 was repeated, using the same scaling-inhibition and fouling-prevention agent as that used in Comparative Example 7 with the concentration, in terms of the solid content, of the agent being 8 mg/liter. The phosphate ion concentration which remained in the filtrate was 3.2 mg $PO_4^{3-}$/liter.

Comparative Example 10

The same experiment as in Example 5 was repeated, except that a solution of the sodium salt of the isoprene-sulfonic acid/acrylic acid/2-hydroxyethylmethacrylate (18/72/10, by mol %) ternary copolymer having a weight average molecular weight of 16,000 was used as the scaling-inhibition and fouling-prevention agent, with the concentration, in terms of the solid content, of the agent being 8 mg/liter. The phosphate ion concentration which remained in the filtrate was 9.3 mg $PO_4^{3-}$/liter.

Comparative Example 11

The same experiment as in Example 5 was repeated, except that a solution of the sodium salt of the isoprene-sulfonic acid/acrylic acid/2-hydroxyethylmethacrylate (20/75/5, by mol %) ternary copolymer having a weight average molecular weight of 14,000 was used as the scaling-inhibition and fouling-prevention agent, with the concentration, in terms of the solid content, of the agent being 8 mg/liter. The phosphate ion concentration which remained in the filtrate was 9.5 mg $PO_4^{3-}$/liter.

Comparative Example 12

The same experiment as in Example 5 was repeated, except that a solution of the sodium salt of the isoprenesulfonic acid/acrylic acid/2-hydroxyethylmethacrylate (15/75/10, by mol %) ternary copolymer having a weight average molecular weight of 14,000 was used as the scaling-inhibition and fouling-prevention agent, in terms of the solid content, of the agent being 8 mg/liter. The phosphate ion concentration which remained in the filtrate was 1.0 mg $PO_4^{3-}$/liter.

Comparative Example 15

The same experiment as in Example 5 was repeated, except that no scaling-inhibition and fouling-prevention agent was added. The phosphate ion concentration which remained in the filtrate was 0.3 mg $PO_4^{3-}$/liter.

The results of Examples 5 to 10 and Comparative Examples 7 to 15 are shown in Table 2.

TABLE 2

| Sample | Scaling-inhibition and fouling-prevention agent | IPS/AA/HEMA (mol %) | Molecular Weight | Amount Added (mg solid content/l) | Filtrate Phosphate Ion Concentration (mg $PO_4^{3-}$/l) |
|---|---|---|---|---|---|
| Example 5 | IPS/AA/HEMA copolymer[1] | 20/75/5 | 14,000 | 8 | 9.5 |
| Example 6 | IPS/AA/HEMA copolymer[1] | 20/75/5 | 14,000 | 6 | 4.2 |
| Example 7 | IPS/AA/HEMA copolymer[1] | 15/75/10 | 14,000 | 8 | 9.1 |
| Example 8 | IPS/AA/HEMA copolymer[1] | 15/75/10 | 14,000 | 6 | 2.8 |
| Example 9 | IPS/AA/HEMA copolymer[1] | 20/70/10 | 13,000 | 8 | 9.7 |
| Example 10 | IPS/AA/HEMA copolymer[1] | 20/70/10 | 9,000 | 8 | 9.4 |
| Comparative Ex. 7 | IPS/AA copolymer[1] | 25/75/0 | 15,000 | 12 | 9.2 |
| Comparative Ex. 8 | IPS/AA copolymer[1] | 25/75/0 | 15,000 | 10 | 6.3 |
| Comparative Ex. 9 | IPS/AA copolymer[1] | 25/75/0 | 15,000 | 8 | 3.2 |
| Comparative Ex. 10 | IPS/AA/HEMA copolymer[1] | 18/72/10 | 16,000 | 8 | 9.3 |
| Comparative Ex. 11 | IPS/AA/HEMA copolymer[1] | 20/75/5 | 14,000 | 8 | 9.5 |
| Comparative Ex. 12 | IPS/AA/HEMA copolymer[1] | 15/75/10 | 14,000 | 8 | 9.1 |
| Comparative Ex. 13 | Sodium polyacrylate | 0/100/0 | 5,000 | 12 | 2.5 |
| Comparative Ex. 14 | Sodium polyacrylate | 0/100/0 | 5,000 | 8 | 1.0 |
| Comparative Ex. 15 | Not added | — | — | 0 | 0.3 |

[1]Sodium Salt
IPS: Isoprenesulfonic acid
AA: Acrylic acid
HEMA: 2-hydroxyethylmethacrylate Comparative Example 13

The same experiment as in Example 5 was repeated, except that a solution of a sodium polyacrylate having a weight average molecular weight of 5,000 was used as the scaling-inhibition and fouling-prevention agent and that the concentration, in terms of the solid content, of the agent was 12 mg/liter. The phosphate ion concentration which remained in the filtrate was 2.5 mg $PO_4^{3-}$/liter.

Comparative Example 14

The same experiment as in Example 5 was repeated, except that the same scaling-inhibition and fouling-prevention agent as that used in Comparative Example 13 was used with the concentration, in terms of the solid content, of the agent being 8 mg/liter. The phosphate ion concentration which remained in the filtrate was 1.0 mg $PO_4^{3-}$/liter.

A high phosphate ion concentration which remains in the filtrate is desirable. The most effective scaling-inhibition and fouling-preventing agent would cause the phosphate ion content of the filtrate from the test liquid to be near to the original phosphate ion content of 10 mg $PO_4^{3-}$/liter.

The more effective scaling-inhibition and fouling-preventing agent results in the less precipitation of calcium phosphate in the above test procedure. As a consequence, the less calcium phosphate precipitated results in more phosphate ions remaining in solution. Accordingly, the more effective agent leads to the higher phosphate ion content of the filtrate from the test liquid.

It is clear that on the other hand, if the effect of the scaling-inhibition and fouling-prevention agent tested against the precipitation of calcium phosphate is smaller, the test liquid to which the agent was added would produce a larger amount of calcium phosphate precipitate. Since the precipitate which contains phosphate is removed through the filtration of the test liquid containing the agent, the filtrate would have a smaller phosphate ion content.

From the results in Table 2, it can be seen that, when the scaling-inhibition and fouling-prevention agent of the present invention comprising an isoprenesulfonic acid/acrylic acid/2-hydroxyethyl methacrylate copolymer was added to the test liquid in an amount of 8 mg, in terms of the solid content of the agent, per liter of the test liquid, the phosphate ion concentration in the filtrate was larger than 9 mg $PO_4^{3-}$/liter. This verifies the excellent effectiveness of the agent against the precipitation of calcium phosphate in the test liquid or, that is, against the formation of scale.

In comparison, when the comparative agent comprising an isoprenesulfonic acid/acrylic acid copolymer was added to the same test liquid in an amount of 8 mg, in terms of the solid content of the agent, per liter of the test liquid, the phosphate ion concentration in the filtrate was only 3.2 mg $PO_4^{3-}$/liter. Thus, there is a significant difference between the scaling-inhibition and fouling-prevention agent of the present invention and the comparative agent in the ability to prevent the precipitation of calcium phosphate.

The comparative agent required addition in an amount of 12 mg, in terms of the solid content of the agent, per liter of the test liquid, to make the phosphate ion concentration in the filtrate larger than 9 mg $PO_4^{3-}$/liter. With regard the other comparative agent comprising a sodium polyacrylate, even when it was added to the same test liquid in an amount of 12 mg, in terms of the solid content of the agent, per liter of the test liquid, the phosphate ion concentration in the filtrate was only 2.5 mg $PO_4^{3-}$/liter.

Hence, the agent of the present invention is more effective at preventing scaling and fouling.

IC) Test for Preventing Precipitation of Zinc Phosphate

Example 11

The components of 1) demineralized water, 2) a solution of calcium chloride, 3) a solution of a scaling-inhibition and fouling-prevention agent comprising the sodium salt of an isoprenesulfonic acid/acrylic acid/2-hydroxyethyl methacrylate (20/75/5, by mol %) ternary copolymer having a weight average molecular weight of 14,000, 4) a solution of zinc chloride, and 5) a solution of sodium hydrogencarbonate were put into a 500 ml conical beaker in that order. Subsequently, an aqueous solution of 1 wt. %-sodium hydroxide was added thereto to adjust the pH of the resulting mixture. Thus, 500 ml of a test liquid was prepared having a pH of 8.6, a solid content of 4 mg/liter of the scaling-inhibition and soil preventing agent, a calcium hardness, in terms of $CaCO_3$ content, of 100 mg/liter, a total alkalinity, in terms of $CaCO_3$ content, of 100 mg/liter, a phosphate ion concentration, in terms of $PO_4^{3-}$, of 6.0 mg/liter, and a zinc ion concentration, in terms of $Zn^{2+}$, of 3.5 mg/liter. The total alkalinity refers to the total acids consumption of a sample titrated by acid to a pH of 4.8 from the alkaline side.

The conical beaker was sealed with a polyethylene film, and left in a water bath filled with water having a controlled temperature of 60° C. After 40 hours, the test liquid was taken out and filtered through a filter paper having a pore diameter of 0.1 μm. The phosphate ion concentration and the zinc ion concentration in total which remained in the resulting filtrate were measured to be 9.4 mg/liter.

Example 12

The same experiment as in Example 11 was repeated, except that a solution of the sodium salt of the isoprenesulfonic acid/acrylic acid/2-hydroxyethylmethacrylate (20/70/10, by mol %) ternary copolymer having a weight average molecular weight of 13,000 was used as the scaling-inhibition and fouling-prevention agent, with the concentration, in terms of the solid content, of the agent being 4 mg/liter. The sum of the phosphate ion concentration and the zinc ion concentration which remained in the filtrate was 9.3 mg $PO_4^{3-}$/liter.

Example 13

The same experiment as in Example 11 was repeated, except that a solution of the sodium salt of the isoprenesulfonic acid/acrylic acid/2-hydroxyethylmethacrylate (20/70/10, by mol %) ternary copolymer having a weight average molecular weight of 9,000 was used as the scaling-inhibition and fouling-prevention agent, with the concentration, in terms of the solid content, of the agent being 4 mg/liter. The amount of 30 wt %-hydrogen peroxide aqueous solution added in Production Example 1 was 21.3 g, to produce a polymer of MW 9,000. The sum of the phosphate ion concentration and the zinc ion concentration which remained in the filtrate was 9.5 mg $PO_4^{3-}$/liter.

Comparative Example 16

The same experiment as in Example 11 was repeated except that a solution of the sodium salt of an isoprenesulfonic acid/acrylic acid (25/75, by mol %) binary copolymer having a weight-average molecular weight of 22,000 was used as the scaling-inhibition and fouling-prevention and that the concentration of the agent was 4 mg, in terms of the solid content, per liter. The sum of the phosphate ion concentration and the zinc ion concentration which remained in the filtrate was 9.0 mg/liter.

Comparative Example 17

The same experiment as in Example 11 was repeated, except that a solution of the sodium salt of the isoprenesulfonic acid/acrylic acid/2-hydroxyethylmethacrylate (18/72/10, by mol %) ternary copolymer having a weight average molecular weight of 16,000 was used as the scaling-inhibition and fouling-prevention agent, with the concentration, in terms of the solid content, of the agent being 4 mg/liter. The sum of the phosphate ion concentration and the zinc ion concentration which remained in the filtrate was 9.3 mg $PO_4^{3-}$/liter.

Comparative Example 18

The same experiment as in Example 11 was repeated, except that a solution of the sodium salt of the isoprenesulfonic acid/acrylic acid/2-hydroxyethylmethacrylate (20/75/5, by mol %) ternary copolymer having a weight average molecular weight of 14,000 was used as the scaling-inhibition and fouling-prevention agent, with the concentration, in terms of the solid content, of the agent being 4 mg/liter. The amount of 30 wt %-hydrogen peroxide aqueous solution added in Production Example 1 was 21.3 g, to produce a polymer of MW 9,000. The sum of the phosphate ion concentration and the zinc ion concentration which remained in the filtrate was 9.4 mg $PO_4^{3-}$/liter.

Comparative Example 19

The same experiment as in Example 11 was repeated except that a solution of a sodium polyacrylate having a weight-average molecular weight of 5,000 was used as the scaling-inhibition and fouling-prevention agent with a concentration of the agent of 10 mg, in terms of the solid content, per liter. The sum of the phosphate ion concentration and the zinc ion concentration which remained in the filtrate was 3.5 mg/liter.

Comparative Example 20

The same experiment as in Example 11 was repeated except that no scaling-inhibition and fouling-prevention agent was added. The sum of the phosphate ion concentration and the zinc ion concentration which remained in the filtrate was 0.2 mg/liter.

The results of Examples 11 to 13 and Comparative Examples 16 to 20 are shown in Table 3.

This shows that the two agents have almost the same effect against the precipitation of zinc phosphate in the test liquid. However, as seen from the results in Table 2, the scaling-inhibition and fouling-prevention agent of the present invention comprising an isoprenesulfonic acid/acrylic acid/2-hydroxyethyl methacrylate is more effective against the precipitation of calcium phosphate than that of the comparative agent comprising an isoprenesulfonic acid/acrylic acid.

Therefore, it is apparent that the scaling-inhibition and fouling-prevention agent of the present invention is preferable to the comparative agent because the present invention is more effectively applicable to more systems than the comparative agent.

TABLE 3

| Sample | Scaling-inhibition and fouling-prevention agent | IPS/AA/HEMA (mol %) | Molecular Weight | Amount Added (mg solid content/l) | Remaining $Zn^{2+}$ ion and $PO_4^{3-}$ ion (mg/l) |
|---|---|---|---|---|---|
| Example 11 | IPS/AA/HEMA copolymer[1] | 20/75/5 | 14,000 | 4 | 9.4 |
| Example 12 | IPS/AA/HEMA copolymer[1] | 20/70/10 | 13,000 | 4 | 9.3 |
| Example 13 | IPS/AA/HEMA copolymer[1] | 20/70/10 | 9,000 | 4 | 9.5 |
| Comparative Ex. 16 | IPS/AA copolymer[1] | 25/75/0 | 22,000 | 4 | 9.0 |
| Comparative Ex. 17 | IPS/AA/HEMA copolymer[1] | 18/72/10 | 16,000 | 4 | 9.3 |
| Comparative Ex. 18 | IPS/AA/HEMA copolymer[1] | 20/75/5 | 14,000 | 4 | 9.4 |
| Comparative Ex. 19 | Sodium polyacrylate | 0/100/0 | 5,000 | 10 | 3.5 |
| Comparative Ex. 20 | Not added | — | — | 0 | 0.2 |

[1]Sodium Salt
IPS: Isoprenesulfonic acid
AA: Acrylic acid
HEMA: 2-hydroxyethylmethacrylate A high sum of the phosphate ion content and the zinc ion content which remains in the filtrate is desirable. The most effective scaling-inhibition and fouling-preventing agent would cause the total phosphate ion and zinc ion content of the filtrate from the test liquid to be near to the sum of the phosphate ion content and the zinc ion content of the original test liquid, which is 9.5 mg/liter.

The more effective scaling-inhibition and fouling-preventing agent results in the less precipitation of zinc phosphate in the above test procedure. As a consequence, the less zinc phosphate precipitated results in more phosphate and zinc ions remaining in solution. Accordingly, the more effective agent leads to the higher total zinc and phosphate ion content of the filtrate from the test liquid.

It is clear that on the other hand, if the effect of the scaling-inhibition and fouling-prevention agent tested against the precipitation of zinc phosphate is smaller, the test liquid to which the agent was added would produce a larger amount of zinc phosphate precipitate. Since the precipitate which contains zinc and phosphate is removed through the filtration of the test liquid containing the agent, the filtrate would have a smaller total zinc and phosphate ion content.

From the results in Table 3, it can be seen from examination of Example 11 and Comparative Example 16, that both the addition of the scaling-inhibition and fouling-prevention agent of the present invention comprising an isoprenesulfonic acid/acrylic acid/2-hydroxyethyl methacrylate ternary copolymer to the test liquid in an amount of 4 mg, in terms of the solid content of the agent, per liter of the test liquid, and the addition of the comparative agent comprising an isoprenesulfonic acid/acrylic acid copolymer, to the test liquid in the same amount, resulted in almost the same total amount of phosphate ion and zinc ion concentration which remained in the filtrate in each, which was about 9.0 mg/liter.

Regarding the other comparative agent of a sodium polyacrylate, even when it was added to the test liquid in an amount in terms of the solid content of the agent of 10 mg/liter of the test liquid, the sum of the phosphate ion concentration and the zinc ion concentration which remained in the filtrate was only 3.5 mg/liter.

ID) Test for Preventing Precipitation of Iron Oxide and Iron Hydroxide

Example 14

The components of 1) demineralized water, 2) a solution of a scaling-inhibition and fouling-prevention agent comprising the sodium salt of an isoprenesulfonic acid/acrylic acid/2-hydroxyethyl methacrylate (20/75/5, by mol %) ternary copolymer having a weight-average molecular weight of 14,000, 3) a solution of sodium hydrogencarbonate, 4) a solution of sodium silicate No. 3, 5) a solution of calcium chloride, 6) a solution of magnesium sulfate, and 7) a solution of ferric chloride were put into a 500-ml conical beaker in that order. Next, an aqueous solution of 1 wt. % sulfuric acid was added thereto to adjust the pH of the resulting mixture.

Thus 500 ml of a test liquid was prepared having a pH of 8.8, a solid content of the scaling-inhibition and fouling-preventing agent of 5.0 mg/liter, a calcium hardness, in terms of $CaCO_3$ content, of 250 mg/liter, a magnesium hardness, in terms of $CaCO_3$ content, of 100 mg/liter, a total alkalinity, in terms of $CaCO_3$ content, of 250 mg/liter, a silica content, in terms of $SiO_2$, of 100 mg/liter and a total iron content, in terms of Fe, of 10 mg/liter. The total alkalinity refers to the total acids consumption of a sample titrated by acid to a pH of 4.8 from the alkaline side. It is common practice in water treatment to express parameter values in terms of $CaCO_3$ content.

The conical beaker was sealed with a polyethylene film, and left in a water bath filled with water having a controlled temperature of 30° C., for 20 hours. Afterwards, the beaker was taken out, and the dissolved iron content of the supernatant thus separated in the beaker was measured to be 10.0 mg Fe/liter.

Example 15

The same experiment as in Example 14 was repeated, except that a solution of the sodium salt of an isoprenesulfonic acid/acrylic acid/2-hydroxyethyl methacrylate (15/75/10, by mol %) ternary copolymer having a weight average molecular weight of 14,000 was used as the scaling-inhibition and fouling-prevention agent and that the concentration of the agent was 5.0 mg, in terms of the solid content, per liter. The dissolved iron content of the supernatant was 10.0 mg Fe/liter.

Example 16

The same experiment as in Example 14 was repeated, except that a solution of the sodium salt of the isoprenesulfonic acid/acrylic acid/2-hydroxyethylmethacrylate (20/70/10, by mol %) ternary copolymer having a weight average molecular weight of 13,000 was used as the scaling-inhibition and fouling-prevention agent, with the concentration, in terms of the solid content, of the agent being 5 mg/liter. The dissolved iron concentration of the supernatant was 10.0 mg Fe/liter.

Example 17

The same experiment as in Example 11 was repeated, except that a solution of the sodium salt of the isoprenesulfonic acid/acrylic acid/2-hydroxyethylmethacrylate (20/70/10, by mol %) ternary copolymer having a weight average molecular weight of 9,000 was used as the scaling-inhibition and fouling-prevention agent, with the concentration, in terms of the solid content, of the agent being 5 mg/liter. The amount of 30 wt %-hydrogen peroxide aqueous solution added in Production Example 1 was 21.3 g, to produce a polymer of MW 9,000. The dissolved iron concentration of the supernatant was 10.0 mg Fe/liter.

Comparative Example 21

The same experiment as in Example 14 was repeated, except that a solution of the sodium salt of an isoprenesulfonic acid/acrylic acid (25/75, by mol %) binary copolymer having a weight-average molecular weight of 16,000 was used as the scaling-inhibition and the fouling-prevention agent and that the concentration of the agent was 7.5 mg, in terms of the solid content, per liter. The dissolved iron content of the supernatant was 10.0 mg Fe/liter.

Comparative Example 22

The same experiment as in Example 14 was repeated, except that the same scaling-inhibition and fouling-prevention agent was used as that in Comparative Example 21 and that the concentration of the agent was 5.0 mg, in terms of the solid content, per liter. The dissolved iron content of the supernatant was 7.8 mg Fe/liter.

Comparative Example 23

The same experiment as in Example 14 was repeated, except that a solution of the sodium salt of an isoprenesulfonic acid/acrylic acid (25/75, by mol %) binary copolymer having a weight average molecular weight of 22,000 was used as the scale inhibiting and fouling-preventing agent with a concentration of the agent of 7.5 mg, in terms of the solid content, per liter. The dissolved iron content of the supernatant was 10.0 mg Fe/liter.

Comparative Example 24

The same experiment as in Example 14 was repeated, except that the same scaling-inhibition and fouling-prevention agent was used as that of Comparative Example 23 with a concentration of the agent of 5.0 mg, in terms of the solid content, per liter. The dissolved iron content of the supernatant was 8.0 mg Fe/liter.

Comparative Example 25

The same experiment as in Example 14 was repeated, except that a solution of the sodium salt of the isoprenesulfonic acid/acrylic acid/2-hydroxyethylmethacrylate (18/72/10, by mol %) ternary copolymer having a weight average molecular weight of 16,000 was used as the scaling-inhibition and fouling-prevention agent, with the concentration, in terms of the solid content, of the agent being 5 mg/liter. The dissolved iron concentration of the supernatant was 9.8 mg Fe/liter.

Comparative Example 26

The same experiment as in Example 14 was repeated, except that a solution of the sodium salt of the isoprenesulfonic acid/acrylic acid/2-hydroxyethylmethacrylate (20/75/5, by mol %) ternary copolymer having a weight average molecular weight of 14,000 was used as the scaling-inhibition and fouling-prevention agent, with the concentration, in terms of the solid content, of the agent being 5 mg/liter. The dissolved iron concentration of the supernatant was 10.0 mg Fe/liter.

Comparative Example 27

The same experiment as in Example 14 was repeated, except that a solution of the sodium salt of the isoprenesulfonic acid/acrylic acid/2-hydroxyethylmethacrylate (15/75/10, by mol %) ternary copolymer having a weight average molecular weight of 14,000 was used as the scaling-inhibition and fouling-prevention agent, with the concentration, in terms of the solid content, of the agent being 5 mg/liter. The dissolved iron concentration of the supernatant was 10.0 mg Fe/liter.

Comparative Example 28

The same experiment as in Example 14 was repeated, except that a solution of sodium hexametaphosphate with a concentration of 10.0 mg, in terms of the solid content, per liter was used as the scaling-inhibition and fouling-prevention agent. The dissolved iron content of the supernatant was 3.3 mg Fe/liter.

Comparative Example 29

The same experiment as in Example 14 was repeated, except that a solution of sodium hexametaphosphate was used as the scaling-inhibition and fouling-prevention agent and that the concentration of the agent was 7.5 mg, in terms of the solid content, per liter. The dissolved iron content of the supernatant was 2.4 mg Fe/liter.

Comparative Example 30

The same experiment as in Example 14 was repeated, except that a solution of a sodium polyacrylate having a weight average molecular weight of 5,000 was used as the scaling-inhibition and fouling-prevention agent with a concentration of 10.0 mg, in terms of the solid content, per liter. The dissolved iron content of the supernatant was 6.0 mg Fe/liter.

Comparative Example 31

The same experiment as in Example 14 was repeated, except that no scaling-inhibition and fouling-prevention agent was added. The dissolved iron content of the supernatant was 0.4 mg Fe/liter.

The results of Examples 14 to 17 and Comparative Examples 21 to 31 are shown in Table 4.

acrylic acid/2-hydroxyethyl methacrylate ternary copolymer, when added to the test liquid in an amount of 5 mg, in terms of the solid content thereof, per liter, inhibited the precipitation of iron to the extent of 10 mg/liter remaining in the supernatant, while acting to completely disperse and keep it in water in the test liquid. Therefore, any concentration of iron less than 10 mg/liter in the test system would dissolve.

In comparison, however, when the comparative agent comprising an isoprenesulfonic acid/acrylic acid copolymer was added to the same test liquid in an amount of 5 mg, in terms of the solid content thereof, per liter, the solution of iron could not reach 10 mg/liter. Instead, the iron concentration remaining in the supernatant was only 7.8 mg/liter

TABLE 4

| Sample | Scaling-inhibition and fouling-prevention agent | IPS/AA/HEMA (mol %) | Molecular Weight | Amount Added (mg solid content/l) | Remaining $Zn^{2+}$ ion and $PO_4^{3-}$ ion (mg/l) |
|---|---|---|---|---|---|
| Example 14 | IPS/AA/HEMA copolymer[1] | 20/75/5 | 14,000 | 5.0 | 10.0 |
| Example 15 | IPS/AA/HEMA copolymer[1] | 15/75/10 | 14,000 | 5.0 | 10.0 |
| Example 16 | IPS/AA/HEMA copolymer[1] | 20/70/10 | 13,000 | 5.0 | 10.0 |
| Example 17 | IPS/AA/HEMA copolymer[1] | 20/70/10 | 9,000 | 5.0 | 10.0 |
| Comparative Ex. 21 | IPS/AA copolymer[1] | 25/75/0 | 16,000 | 7.5 | 10.0 |
| Comparative Ex. 22 | IPS/AA copolymer[1] | 25/75/0 | 16,000 | 5.0 | 7.8 |
| Comparative Ex. 23 | IPS/AA copolymer[1] | 25/75/0 | 22,000 | 7.5 | 10.0 |
| Comparative Ex. 24 | IPS/AA copolymer[1] | 25/75/0 | 22,000 | 5.0 | 8.0 |
| Comparative Ex. 25 | IPS/AA/HEMA copolymer[1] | 18/72/10 | 16,000 | 5.0 | 9.8 |
| Comparative Ex. 26 | IPS/AA/HEMA copolymer[1] | 20/75/5 | 14,000 | 5.0 | 10.0 |
| Comparative Ex. 27 | IPS/AA/HEMA copolymer[1] | 15/75/10 | 14,000 | 5.0 | 10.0 |
| Comparative Ex. 28 | Sodium hexametaphosphate | — | — | 10.0 | 3.3 |
| Comparative Ex. 29 | Sodium hexametaphosphate | — | — | 7.5 | 2.4 |
| Comparative Ex. 30 | Sodium polyacrylate | 0/100/0 | 5,000 | 10.0 | 6.0 |
| Comparative Ex. 31 | Not added | — | — | 0 | 0.4 |

[1]Sodium Salt
IPS: Isoprenesulfonic acid
AA: Acrylic acid
HEMA: 2-hydroxyethylmethacrylate If there is no scaling-inhibition and fouling-prevention agent added to the test liquid or if the effect of any added scaling-inhibition and fouling-prevention agent is not satisfactory, the iron component in the test liquid would precipitate in the form of iron oxide hydrate or iron hydroxide.

Therefore, the effectiveness can be evaluated, of the scaling-inhibition and fouling-prevention agent added to the test liquid, by measuring the dissolved iron content in the supernatant. An effective agent would disperse the iron oxide or iron hydroxide to prevent precipitate formation. Accordingly, an effective agent would lead to a high concentration of iron in the test liquid which can be determined from the dissolved iron content remaining in the supernatant separated from the test liquid to which the agent was added.

The scaling-inhibition and fouling-prevention agent of the present invention comprising an isoprenesulfonic acid/ before iron was precipitated out, thus indicating that a detrimentally substantial amount of iron was precipitated out.

In order to inhibit the precipitation of iron to lead to a concentration of iron of 10 mg/liter in the test liquid, it was necessary to add 7.5 mg/liter, in terms of the solid content, of the comparative agent to the test liquid. Accordingly, the present invention is superior to the comparison isoprenesulfonic acid/acrylic acid copolymer for dispersing iron oxide and iron hydroxide in water.

The other comparative agents comprising sodium hexametaphosphate or sodium polyacrylate of the prior art could not inhibit the precipitation of iron to the extent of 10 mg/liter in the test liquid even when such comparative examples were added to the test liquid in an amount of 10 mg, in terms of the solid content, per liter.

From these results, it is apparent that the scaling-inhibition and fouling-prevention agent of the present invention is much more effective for dispersing iron oxide and iron hydroxide in water than the comparative agents comprising sodium hexametaphosphate or sodium polyacrylate.

Production Example 2

The three monomers, 252.1 g of isoprenesulfonic acid (commercially-available product with an acid content of 40% by weight), 200.3 g of acrylic acid (commercially available product with an acid content of 80% by weight), and 31.4 g of acrylamido-2-methylpropanesulfonic acid (commercially available product with an acid content of 98% by weight), were mixed to prepare an aqueous monomer solution. The molar ratio of isoprenesulfonic acid/acrylic acid/acrylamido-2-methylpropanesulfonic acid in the aqueous monomer solution was 20/75/5.

228.7 g of water and 13.7 g of 30 wt. %-hydrogen peroxide aqueous solution were put into a one liter, four neck separable flask which was equipped with a stirrer, a reflux condenser, a dropping funnel and a nitrogen gas-introducing tube. The aqueous monomer solution that had been prepared above was added dropwise thereto over a period of 2 hours while keeping the inner temperature of the flask at 100° C. to perform polymerization. After the addition, the polymerization was conducted for one hour further. At the end of the hour, 67.3 g of a 48 wt. %-sodium hydroxide aqueous solution was added to the reaction mixture to partially neutralize the mixture. Thus was obtained a ternary copolymer having a number average molecular weight of 22,000. This particular ternary copolymer formed in this Production Example 2 was used below in Example 19.

Using the same process as above but changing the compositional ratio of the monomers reacted and changing the amount of hydrogen peroxide added, various copolymers having different monomer compositions were obtained as shown in Tables 5 to 8.

IIA) Test for Gelling of Scaling-inhibition and fouling-prevention Agent with Calcium Ion Example 18

The components of:
1) demineralized water,
2) a pH buffering solution comprising boric acid and sodium borate,
3) a scaling-inhibition and fouling-preventing agent comprising either
   (A1) a solution of sodium salt of isoprenesulfonic acid/acrylic acid/2-hydroxyethyl methacrylate (20/75/5, by mol %) copolymer having a weight average molecular weight of 14,000 or
   (B2) a solution of sodium salt of isoprenesulfonic acid/acrylic acid/acrylamido-2-methylpropanesulfonic acid (20/75/5, by mol %) copolymer having a weight average molecular weight of 15,000, and
4) a solution of calcium chloride,
were put into a 500-ml conical beaker in that order, to prepare 500 ml of a test liquid having a pH of 8.5, a solid content of the scaling-inhibition and fouling-prevention agent of 100 mg/liter, and a calcium hardness, in terms of $CaCO_3$ content, of 50 mg/liter.

By varying the amount of the calcium chloride solution added, the same process as in Example 18 above was repeated to prepare various test liquids of 500 ml each, having a calcium hardness, in terms of $CaCO_3$ content, of 100, 200, 300, 400, 500, 600, 700, 800, 900, 1000, 1100, and 1200 mg/liter.

The conical beakers each were sealed with a polyethylene film, and left in a water bath filled with water having a controlled temperature of 90° C., for 1 hour. After this treatment, the degree of turbidity of each test liquid was measured. The turbidity results from the gel formed by the bonding of calcium ions to the copolymer of the scaling-inhibition and fouling-prevention agent. The minimum calcium hardness (calcium concentration) that makes the test liquid cloudy (turbid) was defined to be the anti-gelling concentration for the particular copolymer sample tested.

The test samples comprising (A1) and having calcium concentrations, in terms of $CaCO_3$, of 900 mg/liter or less did not become turbid, while those comprising (A1) and having calcium concentrations, in terms of $CaCO_3$, of 1000 mg/liter or more did become turbid. According to the definition, the anti-gelling concentration for the copolymer of the scaling-inhibition and fouling-prevention agent (A1) tested herein was 1000 mg of $CaCO_3$/liter.

On the other hand, the test liquids comprising (B1) and having calcium concentrations, in terms of $CaCO_3$, of 500 mg/liter or less did not become turbid, while those comprising (B1) and having calcium concentrations, in terms of $CaCO_3$, of 600 mg/liter or more did become turbid. The anti-gelling concentration for the copolymer of the scaling-inhibition and fouling-prevention agent (B1) tested herein was 600 mg of $CaCO_3$/liter.

Example 19

The same experiment as in Example 18 was repeated, except that a solution of the sodium salt of an isoprenesulfonic acid/acrylic acid/acrylamido-2-methylpropanesulfonic acid (20/75/5, by mol %) ternary copolymer having a weight average molecular weight of 22,000 was used as the scaling-inhibition and fouling-prevention agent. The anti-gelling concentration for the scaling-inhibition and fouling-prevention agent tested in this example was 600 mg of $CaCO_3$/liter.

Comparative Example 32

The same experiment as in Example 18 was repeated, except that a solution of the sodium salt of an isoprenesulfonic acid/acrylic acid (25/75, by mol %) binary copolymer having a weight average molecular weight of 10,000 was used as the scaling-inhibition and fouling-prevention agent. The anti-gelling concentration for the scaling-inhibition and fouling-prevention agent tested in this comparative example was 400 mg of $CaCO_3$/liter.

Comparative Example 33

The same experiment as in Example 18 was repeated, except that a solution of the sodium salt of an isoprenesulfonic acid/acrylic acid (25/75, by mol %) binary copolymer having a weight average molecular weight of 15,000 was used as the scaling-inhibition and fouling-prevention agent. The anti-gelling concentration for the scaling-inhibition and fouling-prevention agent tested in this comparative example was 400 mg of $CaCO_3$/liter.

Comparative Example 34

The same experiment as in Example 18 was repeated, except that a solution of a sodium polyacrylate having a weight average molecular weight of 5,000 was used as the scaling-inhibition and fouling-prevention agent. The anti-gelling concentration for the scaling-inhibition and fouling-prevention agent tested in this comparative example was 100 mg of $CaCO_3$/liter.

The results of Examples 18 and 19 and Comparative Examples 32 to 34 are shown in Table 5.

TABLE 5

|  | Scaling-inhibition and fouling-prevention Agent | IPS/AA/AMPS (by mol) | Molecular Weight | Amount Added (mg of solid content/liter) | Anti-gelling Concentration (mg) of $CaCO^3$/liter) |
|---|---|---|---|---|---|
| Example 18 | IPS/AA/AMPS Copolymer[1] | 20/75/5 | 15,000 | 100 | 600 |
| Example 19 | IPS/AA/AMPS Copolymer[1] | 20/75/5 | 22,000 | 100 | 600 |
| Comparative Example 32 | IPS/AA Copolymer[1] | 25/75/0 | 10,000 | 100 | 400 |
| Comparative Example 33 | IPS/AA Copolymer[1] | 25/75/0 | 15,000 | 100 | 400 |
| Comparative Example 34 | Sodium Polyacrylate | 0/100/0 | 5,000 | 100 | 100 |

[1]Sodium Salt
IPS: Isoprenesulfonic Acid
AA: Acrylic Acid
AMPS: Acrylamido-2-methylpropanesulfonic Acid As previously discussed, the scaling-inhibition and fouling-prevention agent with the higher anti-gelling concentration can be more stably dissolved in water having a high calcium hardness, than the agent with the lower anti-gelling concentration, while at the same time showing more effective scaling-inhibition and fouling-prevention.

It can be seen from the results of the above examples and comparative examples that the scaling-inhibition and fouling-prevention agents of the present invention, each comprising an isoprenesulfonic acid/acrylic acid/acrylamido-2-methylpropanesulfonic acid ternary copolymer, exhibit a higher anti-gelling ability and therefore can be dissolved more stably in water having a high calcium hardness than the comparative agent comprising a sodium polyacrylate. The examples of the present invention similarly demonstrate higher anti-gelling concentrations than the other comparative prior art agents comprising an isoprenesulfonic acid/acrylic acid copolymer.

IIB) Test for Preventing Precipitation of Calcium Phosphate

Example 20

The ingredients of 1) demineralized water, 2) a pH buffering solution comprising boric acid and sodium borate, 3) a solution of calcium chloride, 4) a solution of a scaling-inhibition and fouling-prevention agent comprising the sodium salt of an isoprenesulfonic acid/acrylic acid/acrylamido-2-methylpropanesulfonic acid (20/75/5, by mol %) ternary copolymer having a weight average molecular weight of 15,000, and 5) a solution of sodium phosphate were put into a 500-ml conical beaker, in that order, to prepare 500 ml of a test liquid having a pH of 8.6, a solid content of the scaling-inhibition and fouling-preventing agent of 8 mg/liter, a calcium hardness, in terms of $CaCO_3$ content, of 100 mg/liter, and a phosphate ion concentration, in terms of $PO_4^{3-}$, of 10 mg/liter.

The conical beaker was sealed with a polyethylene film, and left in a water bath filled with water having a controlled temperature of 60° C. After 40 hours, the test liquid was taken out and filtered through a filer paper having a pore diameter of 0.1 μm, and the phosphate ion concentration which remained in the resulting filtrate was measured to be 9.4 mg $PO_4^{3-}$/liter.

Example 21

The same experiment as in Example 20 was repeated, using the same scaling-inhibition and fouling-prevention agent as that used in Example 20, except that the concentration of the agent was changed to 6 mg, in terms of the solid content, per liter. The phosphate ion concentration which remained in the filtrate was 2.4 mg $PO_4^{3-}$/liter.

Example 22

The same experiment as in Example 20 was repeated, except that a solution of the sodium salt of an isoprenesulfonic acid/acrylic acid/acrylamido-2-methylpropanesulfonic acid (20/75/5, by mol %) ternary copolymer having a weight average molecular weight of 22,000 was used as the scaling-inhibition and fouling-prevention agent with a concentration of the agent of 8 mg, in terms of the solid content, per liter. The phosphate ion concentration which remained in the filtrate was 9.2 mg $PO_4^{3-}$/liter.

Example 23

The same experiment as in Example 20 was repeated, except that the same scaling-inhibition and fouling-prevention agent as that used in Example 22 was used and that the concentration of the agent was 6 mg, in terms of the solid content, per liter. The phosphate ion concentration remained in the filtrate was 1.6 mg $PO_4^{3-}$/liter.

Comparative Example 35

The same experiment as in Example 20 was repeated, except that a solution of the sodium salt of an isoprenesulfonic acid/acrylic acid (25/75, by mol %) binary copolymer having a weight average molecular weight of 15,000 was used as the scaling-inhibition and the fouling-prevention agent and that the concentration of the agent was 12 mg, in terms of the solid content, per liter. The phosphate ion concentration which remained in the filtrate was 9.2 mg $PO_4^{3-}$/liter.

Comparative Example 36

The same experiment as in Example 20 was repeated, except that the same scaling-inhibition and fouling-prevention agent was used as that in Comparative Example 35 and that the concentration of the agent was 10 mg, in terms of the solid content, per liter. The phosphate ion concentration which remained in the filtrate was 6.3 mg $PO_4^{3-}$/liter.

Comparative Example 37

The same experiment as in Example 20 was repeated, except that the same scaling-inhibition and fouling-prevention agent as that used in Comparative Example 35 was used and that the concentration of the agent was 8 mg, in terms of the solid content, per liter. The phosphate ion concentration which remained in the filtrate was 3.2 mg $PO_4^{3-}$/liter.

Comparative Example 38

The same experiment as in Example 20 was repeated, except that a solution of a sodium polyacrylate having a weight-average molecular weight of 5,000 was used as the scaling-inhibition and fouling-prevention agent and that the concentration of the agent was 12 mg, in terms of the solid content, per liter. The phosphate ion concentration which remained in the filtrate was 2.5 mg $PO_4^{3-}$/liter.

Comparative Example 39

The same experiment as in Example 20 was repeated, except that the same scaling-inhibition and fouling-prevention agent as that used in Comparative Example 38 was used with a concentration of 8 mg, in terms of the solid content, per liter. The phosphate ion concentration which remained in the filtrate was 1.0 mg $PO_4^{3-}$/liter.

Comparative Example 40

The same experiment as in Example 20 was repeated, except that no scaling-inhibition and fouling-prevention agent was added. The phosphate ion concentration which remained in the filtrate was 0.3 mg $PO_4^{3-}$/liter.

The results of Examples 20 to 23 and Comparative Examples 35 to 40 are shown in Table 6.

As discussed previously, if the effect is larger from the scaling-inhibition and fouling-prevention agent tested against the precipitation of calcium phosphate, the test liquid to which the agent was added would produce a smaller amount of the calcium phosphate precipitate therein. Therefore, the phosphate ion content of the filtrate from the test liquid containing the more effective agent will be nearer to the original phosphate ion content of the test liquid which was 10 mg $PO_4^{3-}$/liter.

On the other hand, if the effect is smaller from the scaling-inhibition and fouling-prevention agent tested against the precipitation of calcium phosphate, the test liquid to which the less effective agent was added will produce a larger amount of the calcium phosphate precipitate therein. Since the calcium phosphate precipitate is removed through the filtration of the test liquid containing the agent, the filtrate will have a smaller phosphate ion content as a consequence.

From the results in Table 6, it is clear that, when the scaling-inhibition and fouling-prevention agent of the present invention comprising an isoprenesulfonic acid/acrylic acid/acrylamido-2-methylpropanesulfonic acid ternary copolymer was added to the test liquid in an amount of 8 mg, in terms of the solid content of the agent, per liter of the test liquid, the phosphate ion concentration in the filtrate was larger than 9 mg $PO_4^{3-}$/liter. This verifies the excellent effectiveness of the agent of the present invention against the precipitation of calcium phosphate in the test liquid or, that is, against the formation of scale.

In comparison, when the comparative agent comprising an isoprenesulfonic acid/acrylic acid copolymer was added to the same test liquid in the same amount of 8 mg, in terms of the solid content of the agent, per liter of the test liquid, the phosphate ion concentration in the filtrate was only 3.2 mg $PO_4^{3-}$/liter. Thus, there is a significant difference between the scaling-inhibition and fouling-prevention agent of the present invention and the comparative agent in their ability to prevent the precipitation of calcium phosphate.

Only when the comparative agent was added in an increased amount of 12 mg, in terms of the solid content of the agent, per liter of the test liquid, did the phosphate ion concentration in the filtrate become larger than 9 mg $PO_4^{3-}$/liter.

Regarding the other comparative agent comprising a sodium polyacrylate, even when it was added to the same test liquid in an amount of 12 mg, in terms of the solid

TABLE 6

| | Scaling-inhibition and Fouling-Prevention Agent | IPS/AA/AMPS (by mol %) | Molecular Weight | Amount Added (mg of solid content/liter) | Phosphate Ion Concentration Remained (mg $PO_4^{3-}$/liter) |
|---|---|---|---|---|---|
| Example 20 | IPS/AA/AMPS Copolymer[(1)] | 20/75/5 | 15,000 | 8 | 9.4 |
| Example 21 | IPS/AA/AMPS Copolymer[(1)] | 20/75/5 | 15,000 | 6 | 2.4 |
| Example 22 | IPS/AA/AMPS Copolymer[(1)] | 20/75/5 | 22,000 | 8 | 9.2 |
| Example 23 | IPS/AA/AMPS Copolymer[(1)] | 20/75/5 | 22,000 | 6 | 1.6 |
| Comparative Example 35 | IPS/AA Copolymer[(1)] | 25/75/0 | 15,000 | 12 | 9.2 |
| Comparative Example 36 | IPS/AA Copolymer[(1)] | 25/75/0 | 15,000 | 10 | 6.3 |
| Comparative Example 37 | IPS/AA Copolymer[(1)] | 25/75/0 | 15,000 | 8 | 3.2 |
| Comparative Example 38 | Sodium Polyacrylate | 0/100/0 | 5,000 | 12 | 2.5 |
| Comparative Example 39 | Sodium Polyacrylate | 0/100/0 | 5,000 | 8 | 1.0 |
| Comparative Example 40 | Not Added. | — | — | 0 | 0.3 |

Notes:
[(1)]Sodium Salt
IPS: Isoprenesulfonic Acid
AA: Acrylic Acid
AMPS: Acrylamido-2-methylpropanesulfonic Acid content of the agent, per liter of the test liquid, the phosphate ion concentration in the filtrate was nonetheless only 2.5 mg $PO_4^{3-}$/liter.

IIC) Test for Preventing Precipitation of Zinc Phosphate

Example 24

The ingredients of 1) demineralized water, 2) a solution of calcium chloride, 3) a solution of a scaling-inhibition and fouling-prevention agent comprising the sodium salt of an isoprenesulfonic acid/acrylic acid/acrylamido-2-methylpropanesulfonic acid (20/75/5, by mol %) ternary copolymer having a weight average molecular weight of 22,000, 4) a solution of zinc chloride and 5) a solution of the sodium hydrogencarbonate were put into a 500-ml conical beaker in that order. Subsequently, an aqueous solution of 1 wt. %-sodium hydroxide was added thereto to adjust the pH of the resulting mixture.

Thus was prepared 500 ml of a test liquid having a pH of 8.6, a solid content of the scaling-inhibition and fouling-prevention agent of 4 mg/liter, a calcium hardness, in terms of $CaCO_3$ content, of 100 mg/liter, a total alkalinity, in terms of $CaCO_3$ content, of 100 mg/liter, a phosphate ion concentration, in terms of $PO_4^{3-}$, of 6.0 mg/liter and a zinc ion concentration, in terms of $Zn^{2+}$, of 3.5 mg/liter. The total alkalinity refers to the total acids consumption of a sample titrated by acid to a pH of 4.8 from the alkaline side.

The conical beaker was sealed with a polyethylene film, and left in a water bath filled with water having a controlled temperature of 60° C. After 40 hours, the test liquid was taken out and filtered through a filer paper having a pore diameter of 0.1 μm, and the phosphate ion concentration and the zinc ion concentration which remained in the resulting filtrate were measured to be 9.0 mg/liter in total.

Comparative Example 41

The same experiment as in Example 24 was repeated except that a solution of the sodium salt of an isoprenesulfonic acid/acrylic acid (25/75, by mol %) binary copolymer having a weight-average molecular weight of 22,000 was used as the scaling-inhibition and fouling-prevention agent and that the concentration of the agent was 4 mg, in terms of the solid content, per liter. The sum of the phosphate ion concentration and the zinc ion concentration which remained in the filtrate was 9.0 mg/liter.

Comparative Example 42

The same experiment as in Example 24 was repeated except that a solution of a sodium polyacrylate having a weight average molecular weight of 5,000 was used as the scaling-inhibition and fouling-prevention agent and that the concentration of the agent was 10 mg, in terms of the solid content, per liter. In this comparative example, an aqueous solution of 1 wt. %-sodium hydroxide was used for the adjustment of the pH of the mixture in the last step. The sum of the phosphate ion concentration and the zinc ion concentration which remained in the filtrate was 3.5 mg/liter.

Comparative Example 43

The same experiment as in Example 24 was repeated except that no scaling-inhibition and fouling-prevention agent was added. In this, an aqueous solution of 1 wt. %-sodium hydroxide was used for the adjustment of the pH of the mixture in the last step. The sum of the phosphate ion concentration and the zinc ion concentration which remained in the filtrate was 0.2 mg/liter.

The results of Example 24 and Comparative Examples 41 to 43 are shown in Table 7.

TABLE 7

| | Scaling-inhibition and Fouling-prevention Agent | IPS/AA/AMPS (by mol) | Molecular Weight | Amount Added (mg of solid content/liter) | Sum of Phosphate Ion Concentration and Zinc Ion Concentration Remaining (mg/liter) |
|---|---|---|---|---|---|
| Example 24 | IPS/AA/AMPS Copolymer[1] | 20/75/5 | 22,000 | 4 | 9.0 |
| Comparative Example 41 | IPS/AA Copolymer[1] | 25/75/0 | 22,000 | 4 | 9.0 |
| Comparative Example 42 | Sodium Polyacrylate | 0/100/0 | 5,000 | 10 | 3.5 |
| Comparative Example 43 | Not added. | — | — | 0 | 0.2 |

Notes:
[1]Sodium Salt
IPS: Isoprenesulfonic Acid
AA: Acrylic Acid
AMPS: Acrylamido-2-methylpropanesulfonic Acid As discussed previously, if the effectiveness is larger from the scaling-inhibition and fouling-prevention agent tested against the precipitation of zinc phosphate, the test liquid to which the agent was added will produce a smaller amount of the zinc phosphate precipitate therein. Therefore, the sum total of the phosphate ion content and the zinc ion content of the filtrate from the test liquid containing the more effective agent will be nearer to the sum total of the phosphate ion content and the zinc ion content of the original test liquid which was 9.5 mg/liter.

However, if the effectiveness is smaller from the scaling-inhibition and fouling-prevention agent tested against the precipitation of zinc phosphate, the test liquid to which the agent was added will produce a larger amount of the zinc phosphate precipitate therein. Since the precipitate is removed through the filtration of the test liquid containing the agent, the filtrate from he less effective agent will have a smaller total phosphate ion and zinc ion content.

From the results in Table 7, it can be seen that both the addition of the scaling-inhibition and fouling-prevention agent of the present invention comprising an isoprenesulfonic acid/acrylic acid/acrylamido-2-methylpropanesulfonic acid ternary copolymer to the test liquid in an amount of 4 mg, in terms of the solid content of the agent, per liter of the test liquid, and the addition of the comparative agent comprising an isoprenesulfonic acid/ acrylic acid copolymer to the same test solution in the same amount resulted in the same value, 9.0 mg/liter, of the sum of the phosphate ion concentration and the zinc ion concentration which remained in the filtrate.

This demonstrates that the two agents have the same effect against the precipitation of zinc phosphate in the test liquid. However, as previously demonstrated from the results in Table 6, the effect of the scaling-inhibition and fouling-prevention agent of the present invention comprising an isoprenesulfonic acid/acrylic acid/acrylamido-2-methylpropanesulfonic acid ternary copolymer against the precipitation of calcium phosphate is higher than that of the comparative agent comprising an isoprenesulfonic acid/acrylic acid against the same.

Accordingly, it is apparent that the scaling-inhibition and fouling-prevention agent of the present invention is preferable to the comparative agent because the agent of the present invention is more broadly effectively applicable to various systems than the prior art comparison.

Regarding the other comparative agent comprising a sodium polyacrylate, even when it was added to the same test liquid in the increased amount of 10 mg, in terms of the solid content of the agent, per liter of the test liquid, the sum of the phosphate ion concentration and the zinc ion concentration which remained in the filtrate was nonetheless only 3.5 mg/liter.

Accordingly, it is apparent that the scaling-inhibition and fouling-prevention agent of the present invention is more effective and, hence, more preferable than the comparative agent comprising a sodium polyacrylate.

IID) Test for Preventing Precipitation of Iron Oxide and Iron Hydroxide

Example 25

The components 1) demineralized water, 2) a solution of a scaling-inhibition and fouling-prevention agent comprising the sodium salt of an isoprenesulfonic acid/acrylic acid/acrylamido-2-methylpropanesulfonic acid (20/75/5, by mol %) ternary copolymer having a weight average molecular weight of 15,000, 3) a solution of the sodium hydrogencarbonate, 4) a solution of the sodium silicate No. 3, 5) a solution of calcium chloride, a solution of magnesium sulfate, and 6) a solution of ferric chloride were put into a 500-ml conical beaker in that order. Afterwards, an aqueous solution of 1 wt. % sulfuric acid was added thereto to adjust the pH of the resulting mixture.

Thus, 500 ml of a test liquid was prepared having a pH of 8.8, a solid content of the scaling-inhibition and fouling-prevention agent of 5.0 mg/liter, a calcium hardness, in terms of $CaCO_3$ content, of 250 mg/liter, a magnesium hardness, in terms of $CaCO_3$ content, of 100 mg/liter, a total alkalinity, in terms of $CaCO_3$ content, of 250 mg/liter, a silica content, in terms of $SiO_2$, of 100 mg/liter and a total iron content, in terms of Fe, of 10 mg/liter. The total alkalinity refers to the total acids consumption of a sample titrated by acid to a pH of 4.8 from the alkaline side. It is common practice in water treatment to express parameter values in terms of $CaCO_3$ content.

The conical beaker was sealed with a polyethylene film, and left in a water bath filled with water having a controlled temperature of 30° C., for 20 hours. After this treatment, the beaker was taken out, and the dissolved iron content of the supernatant thus separated in the beaker was measured to be 10.0 mg Fe/liter.

Example 26

The same experiment as in Example 25 was repeated, except that a solution of the sodium salt of an isoprenesulfonic acid/acrylic acid/acrylamido-2-methylpropanesulfonic acid (20/75/5, by mol %) ternary copolymer having a weight average molecular weight of 22,000 was used as the scaling-inhibition and fouling-prevention agent at a concentration of 5.0 mg, in terms of the solid content, per liter. The dissolved iron content of the supernatant was 10.0 mg Fe/liter.

Comparative Example 44

The same experiment as in Example 25 was repeated, except that a solution of the sodium salt of an isoprenesulfonic acid/acrylic acid (25/75, by mol %) binary copolymer having a weight average molecular weight of 16,000 was used as the scaling-inhibition and the fouling-prevention agent with a concentration of 7.5 mg, in terms of the solid content, per liter. The dissolved iron content of the supernatant was 10.0 mg Fe/liter.

Comparative Example 45

The same experiment as in Example 25 was repeated, except that the same scaling-inhibition and fouling-prevention agent was used as that used in Comparative Example 44 at a concentration of 5.0 mg, in terms of the solid content, per liter. The dissolved iron content of the supernatant was 7.8 mg Fe/liter.

Comparative Example 46

The same experiment as in Example 25 was repeated, except that a solution of the sodium salt of an isoprenesulfonic acid/acrylic acid (25/75, by mol %) binary copolymer having a weight average molecular weight of 22,000 was used as the scaling-inhibition and the fouling-prevention agent at a concentration of 7.5 mg, in terms of the solid content, per liter. The dissolved iron content of the supernatant was 10.0 mg Fe/liter.

Comparative Example 47

The same experiment as in Example 25 was repeated, except that the same scaling-inhibition and fouling-prevention agent was used as that used in Comparative Example 46, at a concentration of 5.0 mg, in terms of the solid content, per liter. The dissolved iron content of the supernatant was 8.0 mg Fe/liter.

Comparative Example 48

The same experiment as in Example 25 was repeated, except that a solution of sodium hexametaphosphate was used as the scaling-inhibition and fouling-prevention agent at a concentration of 10.0 mg, in terms of the solid content, per liter. The dissolved iron content of the supernatant was 3.3 mg Fe/liter.

Comparative Example 49

The same experiment as in Example 25 was repeated, except that a solution of sodium hexametaphosphate was used as the scaling-inhibition and fouling-prevention agent at a concentration of 7.5 mg, in terms of the solid content, per liter. The dissolved iron content of the supernatant was 2.4 mg Fe/liter.

Comparative Example 50

The same experiment as in Example 25 was repeated, except that a solution of a sodium polyacrylate having a weight average molecular weight of 5,000 was used as the scaling-inhibition and fouling-prevention agent at a concentration of 10.0 mg, in terms of the solid content, per liter. The dissolved iron content of the supernatant was 6.0 mg Fe/liter.

Comparative Example 51

The same experiment as in Example 25 was repeated, except that no scaling-inhibition and fouling-prevention agent was added. The dissolved iron content of the supernatant was 0.4 mg Fe/liter.

The results of Examples 25 to 26 and Comparative Examples 44 to 51 are shown in Table 8.

In comparison, however, when the comparative agent comprising an isoprenesulfonic acid/acrylic acid binary copolymer was added to the same test liquid in an amount of 5 mg, in terms of the solid content thereof, per liter, it could not inhibit the precipitation of iron to 10 mg/liter in the supernatant. In order to inhibit the precipitation of iron to a concentration as high as 10 mg/liter in the test liquid, it was necessary to increase the agent amount to 7.5 mg/liter, in terms of the solid content, of the comparative agent to the test liquid. Thus, it is clear from the data that the ternary

TABLE 8

|  | Scale inhibiting and fouling preventing Agent | IPS/AA/AMPS (by mol) | Molecular Weight | Amount Added (mg of solid content/liter) | Dissolved Iron Concentration Remained (mg Fe/liter) |
| --- | --- | --- | --- | --- | --- |
| Example 25 | IPS/AA/AMPS Copolymer[1] | 20/75/5 | 15,000 | 5.0 | 10.0 |
| Example 26 | IPS/AA/AMPS Copolymer[1] | 20/75/5 | 22,000 | 5.0 | 10.0 |
| Comparative Example 44 | IPS/AA Copolymer[1] | 25/75/0 | 16,000 | 7.5 | 10.0 |
| Comparative Example 45 | IPS/AA Copolymer[1] | 25/75/0 | 16,000 | 5.0 | 7.8 |
| Comparative Example 46 | IPS/AA Copolymer[1] | 25/75/0 | 22,000 | 7.5 | 10.0 |
| Comparative Example 47 | IPS/AA Copolymer[1] | 25/75/0 | 22,000 | 5.0 | 8.0 |
| Comparative Example 48 | Sodium Hexametaphosphate | — | — | 10.0 | 3.3 |
| Comparative Example 49 | Sodium Hexametaphosphate | — | — | 7.5 | 2.4 |
| Comparative Example 50 | Sodium Polacrylate | 0/100/0 | 5,000 | 10.0 | 6.0 |
| Comparative Example 51 | Not Added. | — | — | 0 | 0.4 |

Notes:
[1]Sodium Salt
IPS: Isoprenesulfonic Acid
AA: Acrylic Acid
AMPS: Acrylamido-2-methylpropanesulfonic Acid As discussed previously, if no scaling-inhibition and fouling-prevention agent is added to the test liquid or if the scaling-inhibition and fouling-prevention agent added is ineffective, the iron component in the above test liquid would precipitate out in the form of iron oxide hydrate or iron hydroxide. Therefore, the effect can be evaluated, of the scaling-inhibition and fouling-prevention agents as added to the test liquid, with respect to the agents' effectiveness at dispersing the iron oxide or iron hydroxide precipitate potentially formed in the test liquid. The dispersing power of the agents is correlated to the amount of iron, unprecipitated, remaining in the test liquid.

Thus, measuring the dissolved iron content of the supernatant separated from the test liquid to which the agent was added indicates how effective the agent was at inhibiting the formation of iron based scaling. Accordingly, the higher the iron concentration remaining in the supernatant, the more effective the scaling-inhibition and fouling-prevention agent.

The scaling-inhibition and fouling-prevention agent of the present invention comprising an isoprenesulfonic acid/acrylic acid/acrylamido-2-methylpropanesulfonic acid copolymer, when added to the test liquid in an amount of 5 mg, in terms of the solid content thereof, per liter, inhibited the precipitation of iron of up to a measured 10 mg/liter of iron in the supernatant, while acting to completely disperse and keep the iron in solution in the test liquid.

copolymer of present invention was more effective at inhibiting iron precipitation than the binary copolymer of the prior art.

Regarding the other comparative agents comprising sodium hexametaphosphate or sodium polyacrylate of the prior art, the concentration of iron in the supernatant did not reach 10 mg/liter even when the agents were added to the test liquid in an amount of 10 mg, in terms of the solid content, per liter. Thus, it is clear from the data that the scaling-inhibition and fouling-prevention agent of the present invention is much more effective for dispersing iron oxide and iron hydroxide in water than the comparative agents comprising sodium hexametaphosphate or sodium polyacrylate.

IIIA) Scaling and Corrosion Tests in Pilot Plant of Open Recirculating, Cooling water System (Cooling Tower)— Part 1

Examples 27 and 28, Comparative Example 52

Using a pilot plant as shown in FIG. 1, the water-treating agent of the present invention was tested with respect to its effect against scaling and corrosion therein. The test period was 23 days.

The water balance in the cooling system is shown in Table 9. The quality of make up water as supplied to the system and that of the cooling water as circulating therein are shown in Table 10. The operational conditions for the heat exchangers 1, 2, 3, and 4 used herein are shown in Table 11. The chemicals used herein and their concentrations are shown in Table 12.

TABLE 9

Water Balance in Cooling System

| | |
|---|---|
| Amount of Cooling Water (liter/hr) | 810 |
| Evaporation Loss (liter/hr) | 6 |
| Total Amount of Blowdown Water (liter/hr) | 1.5 |
| Amount of Make-up Water (liter/hr) | 7.5 |
| Cycles of Concentration[*1] | 5.0 |
| Supply Water Temperature (° C.) | 40 |
| Return Water Temperature (° C.) | 47 |
| Rolding Water Volume (liter) | 95 |
| Retention Time[*2] (hr) | 63 |

[*1]Cycles of Concentration = (amount of make-up water, liter/hr)/(amount of total blowdown, liter/hr)
[*2]Retention Time (hr) = (holding water volume of system, liter)/(amount of total blowdown, liter/hr)

TABLE 10

Quality of Make-up Water and Quality of Cooling Water

| | Make-up water | Cooling Water |
|---|---|---|
| pH | 7.5–7.9 | 8.9–9.2 |
| Electrical conductivity (μS/cm) | 297–352 | 1,483–1,760 |
| Total Hardness (mg CaCO$_3$/liter) | 91–120 | 455–598 |
| Calcium Hardness (mg CaCO$_3$/liter) | 70–92 | 350–460 |
| Magnesium Hardness (mg CaCO$_3$/liter) | 21–28 | 105–138 |
| total alkalinity (mg CaCO$_3$/liter) | 75–80 | 375–400 |
| Chloride Ion (mg/liter) | 38–46 | 190–230 |
| Sulfate Ion (mg/liter) | 16–22 | 80–110 |
| Silica (mg SiO$_2$/liter) | 29–37 | 146–184 |

TABLE 11

Operational Conditions of Heat Exchangers

| | | |
|---|---|---|
| Temperature of Water (° C.) | Inlet of Heat Exchanger Part No. 1 (H/E 1) | 40 |
| | Outlet of Heat Exchanger Part No. 4 (H/E 4) | 47 |
| Skin Temperature of Heat Exchanger Tube (at outlet of H/E 4) (° C.) | | 70 |
| Water Flow Velocity in Heat Exchanger (m/s) | | 0.6 |
| Heat Flux (kcal/m$^2$/h) | | 39,000 |
| Material of Heat Exchanger Tubes | | Carbon Steel |

TABLE 12

Chemicals Used

| | | Example 27 | Example 28 | Comparative Example 52 |
|---|---|---|---|---|
| Corrosion Inhibitor (mg/liter) | HEDP[*3] | 4.0 | 4.0 | 4.0 |
| | BT[*4] | 0.5 | 0.5 | 0.5 |
| Scaling-inhibition Agent (mg solid/-liter) | IPS/AA/AMPS[*5] | 11.0 | — | — |
| | IPS/AA/HEMA[*6] | — | 11.0 | — |
| | IPS/AA[*7] | — | — | 11.0 |

[*3]2-hydroxyethylidene-diphosphonic Acid
[*4]Benzotriazole

TABLE 12-continued

Chemicals Used

| | Example 27 | Example 28 | Comparative Example 52 |
|---|---|---|---|

[*5]Isoprenesulfonic acid (IPS)/Acrylic acid (AA)/Acrylamido-2-methylpropanesulfonic acid (AMPS) ternary copolymer having a molar ratio, IPS/AA/AMPS of 15/75/10 and a molecular weight of 15,000
[*6]IPS/AA/2-Hydroxyethyl methacrylate (HEMA) ternary copolymer having a molar ratio, IPS/AA/HEMA of 20/70/10 and a molecular weight of 13,000
[*7]IPS/AA binary copolymer having a molar ratio, IPS/AA of 25/75 and a molecular weight of 16,000

The corrosion rate of the test electrodes as installed at the inlet of the heat exchanger No. 1 (H/E 1) and at the outlet of the heat exchanger No. 4 (H/E 4) was measured, using a corrosion monitor (Corrosion Monitor 500C Model, produced by Toho Giken KK) in accordance with a linear polarization method. The results obtained are shown in Table 13. The scaling rate on the heat transfer tube of each heat exchanger was measured and shown in Table 14.

TABLE 13

Results of Corrosion Test

| | | Rate of Corrosion (mg/dm$^2$/day) | | |
|---|---|---|---|---|
| Installation of Electrode | Material of Electrode | Example 27 | Example 28 | Comparative Example 52 |
| Inlet of H/E 1 (temperature of water: 40° C.) | Carbon Steel | 5.5 | 4.0 | 6.4 |
| | Copper | 0.5 | 0.5 | 0.8 |
| Outlet of H/E 4 (temperature of water: 47° C.) | Carbon Steel | 7.4 | 6.3 | 10.1 |
| | Copper | 0.8 | 0.4 | 1.2 |

TABLE 4

Results of Scaling Test

| | Scaling Rate (mg/cm$^2$/month) | | |
|---|---|---|---|
| Heat Exchanger | Example 27 | Example 28 | Comparative Example 52 |
| H/E 1 (temperature of water at inlet: 40° C.) | 0.9 | 1.1 | 3.4 |
| H/E 2 | 0.9 | 1.1 | 3.5 |
| H/E 3 | 2.0 | 1.0 | 8.9 |
| H/E 4 (temperature of water at outlet: 47° C.) | 2.6 | 1.8 | 12.7 |

As is obvious from the test results displayed above, the compositions of the present invention of Examples 27 and 28 are superior to the comparative composition of Comparative Example 52 by being more effective than Comparative Example 52 against the corrosion of carbon steel and copper and against the scaling of heat transfer tubes in the heat exchangers.

Examination of the scale formed in the above experiment found that the scale from Comparative Examples 52 consisted of 65% magnesium silicate, while the magnesium silicate content of the scale formed in Example 27 was 35% and that of the scale formed in Example 28 was 25%. It is apparent from these results that the compositions of the present invention are very effective against the formation of silica scale, more so than that of the comparative composition.

Accordingly, it is seen from the above data that the scaling-inhibition and fouling-prevention agent of the present invention, which is obtained by introducing a third component of acrylamido-2-methylpropanesulfonic acid and/or 2-hydroxyethyl methacrylate into an isoprenesulfonic acid-acrylic acid binary copolymer system, exhibits a greater effectiveness against corrosion and scaling in water systems than an isoprenesulfonic acid-acrylic acid binary copolymer, when combined with a corrosion inhibitor.

IIB) Scaling and Corrosion Tests in the Pilot Plant of Open Recirculating, Cooling-water System (Cooling Tower)—Part 2

Example 29, Comparative Example 53

Using the same pilot plant under the same operational conditions as in Examples 27 and 28 but varying the quality of water supplied into the plant, the water-treating agent of the present invention was tested with respect to the agent's effectiveness against scaling and corrosion therein. The test period was 23 days. The water balance in the cooling system was the same as that in Table 9. The operational conditions employed herein for the heat exchanger were the same as those in Table 11.

The quality of water as supplied to the system and that of the cooling water as circulating therein are shown in Table 15. The chemicals used herein and their concentrations are shown in Table 16.

TABLE 15

Quality of Make-up Water and Quality of Cooling Water

|  | Make-up Water | Cooling Water |
|---|---|---|
| pH | 7.3–7.6 | 8.3–8.7 |
| Electrical conductivity ($\mu$S/cm) | 172–192 | 810–1,016 |
| Total Hardness (mg $CaCO_3$/liter) | 42–58 | 196–305 |
| Calcium Hardness (mg $CaCO_3$/liter) | 35–46 | 163–245 |
| Magnesium Hardness (mg $CaCO_3$/liter) | 7–12 | 33–60 |
| total alkalinity (mg $CaCO_3$/liter) | 37–41 | 158–215 |
| Chloride Ion (mg/liter) | 29–32 | 134–167 |
| Sulfato Ion (mg/liter) | 17–19 | 74–95 |
| Silica (mg $SiO_2$/liter) | 9–11 | 40–60 |

TABLE 16

Chemicals Used

|  |  | Example 29 | Comparative Example 53 |
|---|---|---|---|
| Corrosion Inhibitor (mg/liter) | SHP[*8] | 3.0 | 3.0 |
|  | $NaH_2PO_4$ | 1.5 | 1.5 |
|  | PBTC[*9] | 3.0 | 3.0 |
|  | $ZnCl_2$ | 6.0 | 6.0 |
|  | TT[*10] | 0.5 | 0.5 |
| Scaling-Inhibition Agent (mg solid/-liter) | IPS/AA/ HEMA[*11] | 12.0 | — |
|  | IPS/AA[*12] | — | 12.0 |

[*8]Sodium Hexametaphosphate
[*9]Phosphonobutane-tricarboxylic Acid
[*10]Tolyltriazole
[*11]as [*6] in Table 12
[*12]Same as [*7] in Table 12

In the same manner as in Example 17, the corrosion rate of the test electrodes and the scaling rate of the heat-transfer tubes were measured. The data obtained are shown in Tables 17 and 18.

TABLE 17

Results of Corrosion Test

| | | Corrosion Rate (mg/dm$^2$/day) | |
|---|---|---|---|
| Installation of Electrode | Material of Electrode | Example 29 | Comparative Example 53 |
| Inlet of H/E 1 (temperature of water: 40° C.) | Carbon Steel | 1.6 | 5.8 |
|  | Copper | 0.3 | 0.4 |
| Outlet of H/E 4 (temperature of water: 47° C.) | Carbon Steel | 1.7 | 7.2 |
|  | Copper | 0.2 | 0.5 |

TABLE 18

Results of Scaling Test

| | Scaling Rate (mg/cm$^2$/month) | |
|---|---|---|
| Heat Exchanger | Example 29 | Comparative Example 53 |
| H/E 1 (temperature of water at inlet: 40° C.) | 1.0 | 3.5 |
| H/E 2 | 1.0 | 3.3 |
| H/E 3 | 1.1 | 7.2 |
| H/E 4 (temperature of water at outlet: 47° C.) | 1.5 | 8.1 |

As in Examples 27 and 28, the scaling-inhibition and fouling-prevention agent of the present invention exhibited a greater effectiveness against corrosion and scaling in the water system tested herein, than the comparative, isoprenesulfonic acid-acrylic acid copolymer, when combined with a corrosion inhibitor.

As has been described in detail and demonstrated by the data hereinabove, the water-treating agent of the present invention, comprising a conjugated dienesulfonic acid/(meth)acrylic acid/2-hydroxyethyl (meth)acrylate ternary copolymer or comprising a conjugated dienesulfonic acid/(meth)acrylic acid/(meth)acrylamido-2-methylalkanesulfonic acid ternary copolymer, exhibits an excellent anti-scaling and anti-fouling effect in water systems and can therefore prevent water systems from malfunctions arising from reduced thermal efficiency and reduced water flow rate caused by the adhesion or deposition of scale, sludge and slime onto heat exchangers, heat transfer heating pipes, and other such pipe lines that constitute water systems.

Having described preferred embodiments of the invention with reference to the accompanying drawing, it is to be understood that the invention is not limited to those precise embodiments, and that various changes and modifications may be effected therein by one skilled in the art without departing from the scope or spirit of the invention as defined in the appended claims.

What is claimed is:

1. A method for treating water to prevent scale and slime formation and to prevent fouling, comprising the steps of:

polymerizing a combination comprising

A) a first monomer selected from the group consisting of a conjugated dienesulfonic acid and a salt of a conjugated dienesulfonic acid, said conjugated dienesulfonic acid represented by the general formula [1]:

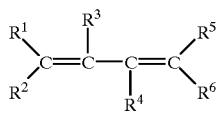

[1]

wherein $R^1$, $R^2$, $R^3$, $R^4$, $R^5$ and $R^6$ each represents a member selected from the group consisting of a hydrogen atom, a methyl substituent, and a $—SO_3X^1$ substituent,
wherein at least one of $R^1$ to $R^6$ is a methyl substituent,
wherein at least one of $R^1$ to $R^6$ is a $—SO_3X^1$ substituent, and
wherein $X^1$ represents a member selected from the group consisting of hydrogen atom, a monovalent metal an ammonium substituent, and an ammonium substituent which is mono-substituted by an organic substituent;

B) a second monomer selected from the group consisting of a (meth)acrylic acid and a salt of a (meth) acrylic acid, said (meth)acrylic acid represented by the general formula [2]:

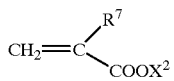

[2]

wherein $R^7$ represents a hydrogen atom or a methyl substituent; and $X^2$ represents a member selected from the group consisting of a hydrogen atom, a monovalent metal, an ammonium substituent, and an ammonium substituent which is mono substituted by an organic substituent;
and C) a third monomer selected from the group consisting of a 2-hydroxyethyl (meth)acrylate represented by the general formula [3], a (meth) acrylamido-2- methylalkanesulfonic acid, and a salt of a (meth)acrylamido- 2-methylalkanesulfonic acid, said (meth)acrylamido-2-methylalkanesulfonic acid represented by the general formula [4]:

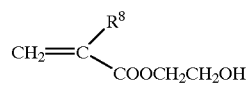

[3]

wherein $R^8$ represents a hydrogen atom or a methyl substituent,

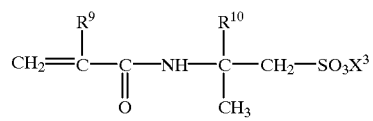

[4]

wherein $R^9$ and $R^{10}$ are members selected from the group consisting of a hydrogen atom and a methyl substituent; and $X^3$ represents a member selected from the group consisting of a hydrogen atom, a monovalent metal, an ammonium substituent, and an ammonium substituent which is mono substituted by an organic substituent,
to form a ternary copolymer having a weight average molecular weight of between about 9,000 and about 14,000, wherein said step of polymerizing includes polymerizing said combination of from about 5 to about 50 mol % of said first monomer, from about 40 to about 90 mol % of said second monomer, and from about 1 to about 20 mol % of said third monomer; and adding said ternary copolymer to a water system in an amount of from about 0.1 to about 1000 mg/liter.

2. The method for treating water as claimed in claim 1, wherein said third monomer is 2-hydroxyethyl (meth) acrylate.

3. The method for treating water as claimed in claim 1, wherein said third monomer is at least one of a (meth) acrylamido-2- methylalkanesulfonic acid and a salt of a (meth)acrylamido- 2-methylalkanesulfonic acid.

4. The method for treating water as claimed in claim 1, wherein said step of polymerizing includes polymerizing wherein at least one of said $X^1$, said $X^2$, and said $X^3$ is formed through the reaction of $—SO_3H$ or $—COOH$ with a primary amine selected from the group consisting of methylamine, ethylamine, propylamine, isopropylamine, butylamine, isobutylamine, sec-butylamine, tert-butylamine, pentylamine, hexylamine, cyclohexylamine, benzylamine, and monoethanolamine to produce said ammonium substituent mono substituted by an organic group.

5. The method for treating water as claimed in claim 1, further including a step of adding a corrosion inhibitor to the water system.

6. The method for treating water as claimed in claim 5, wherein said step of adding a corrosion inhibitor includes adding a member selected from the group consisting of polyvalent metal salts, phosphonates, azoles, phosphates, polyphosphates, phosphonocarboxylates, amines and phosphoric esters.

7. The method for treating water as claimed in claim 5, wherein said step of adding a corrosion inhibitor includes adding said corrosion inhibitor in an amount of from about 0.1 to about 10 parts by weight relative to one part of said ternary copolymer.

* * * * *